US011529573B2

(12) United States Patent
Sergerie et al.

(10) Patent No.: US 11,529,573 B2
(45) Date of Patent: Dec. 20, 2022

(54) SYSTEMS AND PROCESSES EMPLOYING WET/DRY SUCTION FILTER

(71) Applicant: GREATPYR RESOURCES LLC, Willis, TX (US)

(72) Inventors: Helen Sergerie, Willis, TX (US); Charles G. Dannemann, Willis, TX (US)

(73) Assignee: GREATPYR RESOURCES LLC, Willis, TX (US)

( * ) Notice: Subject to any disclaimer, the term of this patent is extended or adjusted under 35 U.S.C. 154(b) by 133 days.

(21) Appl. No.: 16/708,645

(22) Filed: Dec. 10, 2019

(65) Prior Publication Data
US 2021/0187420 A1    Jun. 24, 2021

Related U.S. Application Data

(60) Provisional application No. 62/837,490, filed on Apr. 23, 2019.

(51) Int. Cl.
*B01D 33/06* (2006.01)
*C02F 1/00* (2006.01)
(Continued)

(52) U.S. Cl.
CPC ........... *B01D 33/06* (2013.01); *B01D 33/073* (2013.01); *B01D 33/463* (2013.01); *B01D 33/82* (2013.01);
(Continued)

(58) Field of Classification Search
CPC ...... B01D 33/06; B01D 33/07; B01D 33/073; B01D 33/46; B01D 33/463; B01D 33/50; B01D 33/503; C02F 11/126
See application file for complete search history.

(56) References Cited

U.S. PATENT DOCUMENTS 690,030 A * 12/1901 Parker ................... B01D 3/06
210/391
1,649,220 A    11/1927 Goodloe
(Continued)

FOREIGN PATENT DOCUMENTS

CA    2023302 A1    2/1991
CN    201085959 Y    7/2008
(Continued)

OTHER PUBLICATIONS

Ashbrook Simon-Hartley, ISO-DISC(TM) booklet, 47 pages, Ashbrook Simon-Hartley Operations, LP, 2009.
(Continued)

*Primary Examiner* — Benjamin M Kurtz
(74) *Attorney, Agent, or Firm* — Jeffrey L. Wendt; The Wendt Firm, P.C.

(57) ABSTRACT

Water or wastewater filtration systems and processes have a filter tank having a floor and sidewall defining a filtration zone, an influent conduit, and an effluent conduit. One or more filtration members in the tank having filter media, and one or more cleaning members adjacent at least some portions of the filter media. Generating an effluent stream by generating a pressure differential across submerged portions of the filtration media, causing water in the influent to flow from outside to inside the submerged portions of the filter media. A prime mover rotates the filtration members. A blower and chamber for creating a reduced pressure condition in each of the cleaning members when they are non-submerged, the chamber receiving wet solids removed from non-submerged, wet solids-laden portions of the filter media by the non-submerged cleaning members subsequent to submerged, fouled portions of the filter media being rotated out of the filtration zone.

15 Claims, 12 Drawing Sheets

(51) Int. Cl.
  *B01D 33/073* (2006.01)
  *B01D 33/46* (2006.01)
  *B01D 33/82* (2006.01)
  *B01D 33/42* (2006.01)
  *B01D 33/80* (2006.01)

(52) U.S. Cl.
  CPC ............ *C02F 1/004* (2013.01); *B01D 33/42* (2013.01); *B01D 33/801* (2013.01); *B01D 2033/07* (2013.01)

(56) References Cited

U.S. PATENT DOCUMENTS

| | | | |
|---|---|---|---|
| 1,833,315 A | 11/1931 | Burhans | |
| 2,603,354 A | 7/1952 | Way et al. | |
| 2,650,810 A | 9/1953 | Nordell | |
| 2,997,284 A | 8/1961 | Nechine | |
| 3,116,021 A | 12/1963 | Born | |
| 3,339,901 A | 9/1967 | Walker | |
| 3,357,566 A | 12/1967 | Schmid et al. | |
| 3,640,395 A | 2/1972 | Kinney | |
| 3,673,048 A | 6/1972 | Gidge et al. | |
| 3,755,055 A | 8/1973 | Lochner | |
| 3,969,247 A * | 7/1976 | Emmett, Jr. ......... | B01D 33/663 210/771 |
| 4,090,965 A | 5/1978 | Fuchs | |
| 4,152,265 A | 5/1979 | Meyers | |
| 4,167,482 A | 9/1979 | Mueller | |
| 4,273,732 A | 6/1981 | Roediger | |
| 4,563,277 A | 1/1986 | Tharp | |
| 4,639,315 A | 1/1987 | Fuch et al. | |
| 4,643,828 A | 2/1987 | Barzuza | |
| 4,646,769 A | 3/1987 | O'Brien et al. | |
| 4,702,845 A | 10/1987 | Wykoff | |
| 4,702,847 A | 10/1987 | Fux et al. | |
| 4,725,292 A | 2/1988 | Williams | |
| 4,759,846 A | 7/1988 | MacFarlane | |
| 4,818,402 A | 4/1989 | Steiner et al. | |
| 4,869,823 A | 9/1989 | Otani et al. | |
| 4,898,671 A | 2/1990 | Fux et al. | |
| 5,152,891 A | 10/1992 | Netkowicz et al. | |
| 5,268,095 A | 12/1993 | Barzuza | |
| 5,290,487 A | 3/1994 | Ludwig | |
| 5,346,519 A | 9/1994 | Williams | |
| 5,356,532 A | 10/1994 | Wilkins et al. | |
| 5,374,360 A | 12/1994 | Weis | |
| 5,401,405 A | 3/1995 | McDougald | |
| 5,409,618 A | 4/1995 | Price | |
| 5,464,542 A | 11/1995 | Grienberger et al. | |
| 5,514,270 A | 5/1996 | Barzuza | |
| 5,560,835 A | 10/1996 | Williams | |
| 5,587,114 A | 12/1996 | Tharp | |
| 5,635,066 A | 6/1997 | Maurer | |
| 5,653,874 A | 8/1997 | Berry, III | |
| 5,690,864 A | 11/1997 | Tyer | |
| 5,876,612 A | 3/1999 | Astrom | |
| 5,925,155 A * | 7/1999 | Rodgers ................. | B01D 46/20 55/282 |
| 5,951,878 A | 9/1999 | Astrom | |
| 6,090,298 A | 7/2000 | Weis | |
| 6,103,132 A * | 8/2000 | Seyfried .............. | B01D 33/073 210/791 |
| 6,267,879 B1 | 7/2001 | Gil | |
| 6,294,098 B1 | 9/2001 | Bergmann | |
| 6,793,823 B2 | 9/2004 | Hubenthal et al. | |
| 6,858,140 B2 | 2/2005 | Smith et al. | |
| 7,097,046 B2 | 8/2006 | Calabrese | |
| 7,270,750 B2 | 9/2007 | Galland et al. | |
| 7,300,585 B1 | 11/2007 | Holzworth et al. | |
| 7,485,231 B2 | 2/2009 | Yeom et al. | |
| 7,526,848 B2 | 5/2009 | Lindbo | |
| 7,537,689 B2 | 5/2009 | Ricketts | |
| 7,678,284 B2 | 3/2010 | Ricketts | |
| 7,736,526 B2 | 6/2010 | Smith et al. | |
| 7,807,050 B2 | 10/2010 | Baumann et al. | |
| 7,820,062 B2 | 10/2010 | Ricketts | |
| 7,833,424 B1 | 11/2010 | Baumann et al. | |
| 7,871,527 B2 | 1/2011 | Smith et al. | |
| 7,981,290 B2 | 7/2011 | Baumann et al. | |
| 8,048,296 B2 | 11/2011 | Stevens | |
| 8,101,090 B2 | 1/2012 | Ralvert | |
| 8,329,045 B2 | 12/2012 | Baumann et al. | |
| 8,444,862 B2 | 5/2013 | Ralvert | |
| 8,518,273 B2 | 8/2013 | Lownertz et al. | |
| 8,647,516 B2 | 2/2014 | Love | |
| 8,778,174 B2 | 7/2014 | Xia et al. | |
| 8,852,445 B2 | 10/2014 | Xia et al. | |
| 2002/0050283 A1 | 5/2002 | Bergmann | |
| 2004/0124158 A1 | 7/2004 | Smith et al. | |
| 2004/0132373 A1 | 7/2004 | Muller | |
| 2004/0245190 A1 | 12/2004 | Baumann et al. | |
| 2005/0000870 A1 | 1/2005 | Ricketts | |
| 2005/0115911 A1 | 6/2005 | Smith et al. | |
| 2005/0161393 A1 | 7/2005 | Baumann et al. | |
| 2008/0011666 A1 | 1/2008 | Baumann et al. | |
| 2009/0178976 A1 | 7/2009 | Stevens | |
| 2010/0300957 A1 | 12/2010 | Baumann et al. | |
| 2010/0300989 A1 | 12/2010 | Baumann et al. | |
| 2011/0108496 A1 | 5/2011 | Baumann et al. | |
| 2011/0120960 A1 | 5/2011 | Smith et al. | |
| 2012/0091065 A1 | 4/2012 | Xia et al. | |
| 2013/0068685 A1 | 3/2013 | Baumann et al. | |
| 2013/0105415 A1 | 5/2013 | Xia et al. | |
| 2016/0114265 A1 | 4/2016 | Liberman | |
| 2017/0088435 A1 * | 3/2017 | Schuiten ................. | C02F 1/004 |
| 2017/0165597 A1 | 6/2017 | Kotler | |
| 2018/0099237 A1 | 4/2018 | Silverwood et al. | |

FOREIGN PATENT DOCUMENTS

| | | |
|---|---|---|
| CN | 106731152 A | 5/2017 |
| CN | 108654182 A | 10/2018 |
| GB | 2162080 A | 1/1986 |
| JP | 2005270808 A | 10/2005 |
| NL | 8103750 A | 3/1983 |

OTHER PUBLICATIONS

California Water Boards, "Alternative Treatment Technology Report for Recycled Water", p. 1-67, State of California, 2014.
Aqua-Aerobic Systems, Inc. brochure, "Cloth Media Filtration", pp. 1-12, Aqua-Aerobics Systems, Inc., 2019.
Aqua-Aerobic Systems, Inc. brochure, "AquaDrum(R) Cloth Media Filter", pp. 1-2, Aqua-Aerobics Systems, Inc., 2013.
Ashbrook Simon-Hartley Operations LP brochure, "Enviro-Disc(TM) Disk Filter", pp. 1-2, Ashbrook Simon-Hartley Operations LP, 2008.
Aqua-Aerobic Systems, Inc. brochure, "Aqua Cloth Media Filtration", pp. 1-8, Aqua-Aerobics Systems, Inc., 2006.
Mansell, et al., "Pilot Scale Evaluation of Cloth Media Filter Technology", pp. 1-8, published by Sanitation Districts of Los Angeles County, 2008.
Furuya, A., "Evaluation and Design of a Cloth Disk Filter to Meet Title 22 Reuse Criteria", pp. 1-11, Jan. 1, 2005.
Five Star Filtration LLC brochure, "Five Star Disk Filter", pp. 1-4, Five Star Filtration LLC, 2018.
Nexom website pages for "INFINI-D" (TM) cloth disk filter, downloaded from the Internet Mar. 18, 2020, at url: https://nexom.com/infini-d.

\* cited by examiner

SYSTEMS AND PROCESSES EMPLOYING WET/DRY SUCTION FILTER

CROSS-REFERENCE TO RELATED APPLICATIONS

This application is entitled to and claims the benefit of earlier filed provisional application Ser. No. 62/837,490, filed Apr. 23, 2019, under 35 U.S.C. § 119(e), which earlier filed provisional application is incorporated by reference herein in its entirety.

BACKGROUND INFORMATION

Technical Field

The present disclosure relates to systems and processes for water and wastewater filtration. In particular, the present disclosure relates to systems and processes featuring one or more filtration members that may be operated partially or fully submerged, and subsequently cleaned when partially submerged.

Background Art

At current time, disk filters typically applied to water treatment/purification typically are available in one of two forms as described below. The majority of the existing innovation relates to the design of backwash shoes or sprayers that are used to clean the filter media either by backwashing under suction with filtrate or pressure washing with filtrate.

One system may be described as a partially submerged, pressure wash, "mesh" screen (flat, woven, media), disk filter. In these systems the filter media is partially submerged, and the portion that is not submerged is subjected to pressure washing to clean the mesh or wire fabric (cloth) filters. These filters operate with the active filter media partially submerged and filter "inside to outside" with contaminants collecting on the inside of the filter disks. When backwashed or regenerated, the disks are rotated, and the exposed (non-submerged) portion of the disks are pressure washed from the exterior to dislodge the solids which are collected in an interior trough for removal from the system. These filters must backwash "through" the media from clean side to dirty side to regenerate.

Other available and known systems may be described as fully submerged, flooded suction, cloth/pile media, disk (or drum type) filters. These filters operate with the active filter media fully submerged and filter "outside to inside" with contaminants collecting on the outside of the filter disk or drum cloth media coated surfaces. When backwashed or regenerated, the disks are rotated (such as employed in commercial systems known under the trade designations AQUADISK and AQUADRUM) or backwash heads are actuated (such as employed in commercial systems known under the trade designations ISO-DISC, FIVE STAR, NEXOM INFINI-D) and the fully submerged disks are vacuumed with reverse water flow of filtered water from the interior of the disk by a solids handling water pump with the collected solids being pumped from the system.

One disadvantage of the currently available filtration systems and processes is that a portion of the filtered product must backflow through the filter media to 'backwash' the filter media and remove accumulated solids. The volume of backwash water is a paramount indicator of filter efficiency with less being considered better as the backwash volume requires additional handling and treatment. Another disadvantage is that in the "inside to outside" filtration systems, backwash can only be accomplished by pumping filtrate under pressure from the outside to the inside, and in "outside to inside" filtration systems, the backwash occurs by use of submerged, liquid backwash shoes connected to the suction side of a pump which draws filtered water through the filter media while the filter media is submerged. Yet another disadvantage of pile cloth media filters, which always operate in the outside—inside filtration path as described above, is that they experience a significant hydraulic force of compression due to forward flow and cloth media blinding as it becomes clogged with solids. As a result of the described force, existing filters must overcome the effect of this force to effectively backwash. This includes a backwash volume equivalent to or greater than the forward flow which has a net negative influence on the backwash rate. A second detrimental effect of the hydraulic force a submerged filter experiences is "waffling" or suppression of the cloth media into the open spaces of the support frame the material typically sits on. This creates recessed nooks which allow untreated water to short circuit the backwash process and reduce the effectiveness of the backwash pump while increasing backwash volumes.

Still other inefficiencies in current filter configurations, whether inside-outside filtration or outside-inside filtration, may be noted. With filters of inside-outside filtration paths, the filters are backwashed by pressure wash from the clean side of the media with the removed solids falling into an interior 'rain gutter' for removal. While much of the backwash water is collected in the gutter for removal from the system, it is inevitable that some of the backwash water with solids runs down the interior of the disk cavity and/or falls or splatters outside of the trough to commingle with the influent and are eventually re-filtered, accelerating the frequency of backwash events and increasing the overall backwash volume. With filters of outside-inside design, there is typically a series of cleaning shoes which are cycled through in sequence to backwash a filter. Often only a portion of the backwash shoes are under hydraulic suction while the entire mechanical device including backwash shoes not under suction is energized to move across the filter media. The non-backwashing (not under suction) cleaning shoes remain on the soiled cloth media which remains under forward hydraulic feed and act as a squeegee against the cloth displacing solids from the cloth into the feed but also breaking down and forcing solids through the cloth media and into the effluent causing a reduction in effluent quality.

Current filter designs function with either a near flat, mesh type media (partially submerged, inside to outside, pressure wash backwash) or 'pile' cloth media (fully submerged, outside to inside, submerged suction to clean. It would therefore be advantageous to provide systems and processes permitting the use of all media types (wire cloth, wire mesh, polymer mesh, pile cloth, woven cloth, felt, and other "deep" or "flat/thin" medias with an outside-inside filtration path and direct cleaning of the fouled side of the media. It would further be advantageous to provide systems and processes where mechanical contact and level of 'suction' engagement may be managed to not damage or reduce damage to typically frail, flat finer pore size medias (such as felt or thin wire mesh). It would be further advantageous to provide systems and processes exhibiting reduced backwash volumes, improved dewatering, multiple process applications, absolute pore size filtration, staged filtration (for example 100 micron belt, 10 micron nominal pile cloth, 1 micron felt) using substantially the same machine design. It would further be advantageous to provide systems and processes offering partial and gradual additional submergence as head levels in the filter tank increase due to solids build up on the cloth. It would further be an advance in the art if systems and processes were provided that could handle upset conditions that may cause (in conventional filters) sudden and rapid increase in solids loading due to upset upstream processes.

It would further be advantageous to provide systems and processes employing reduced piping, reduced valve sizes, reduced power, and reduced related equipment foot print compared with presently available systems, and which may eliminate the need for freeze protection.

As may be seen, current practice may not be adequate for all circumstances, and may result in one or more deficiencies as noted above. There remains a need for more robust filtration systems and processes. The systems and processes of the present disclosure are directed to these needs.

SUMMARY

In accordance with the present disclosure, systems and processes are described which reduce or overcome many of the faults of previously known systems and processes.

A first aspect of the disclosure are systems, one system embodiment comprising (or consisting essentially of, or consisting of) a water or wastewater filtration system comprising:

a) a filter tank having a floor and sidewall defining a filtration zone, an influent conduit and an effluent conduit (it will be understood that there may, in certain embodiments, be more than one influent conduit and more than one effluent conduit);

b) one or more filtration members positioned in the filter tank, the one or more filtration members and the filter tank comprising a filter unit, each of the one or more filtration members comprising a filter media that may be the same or different;

c) one or more cleaning members positioned adjacent, or positionable adjacent, at least some portions of the filter media;

d) the filter unit configured to produce, either by gravity-driven hydraulic head, one or more pumps, or both, an effluent stream by generating sufficient pressure differential across submerged portions of the filter media to force water from an influent water or wastewater composition to flow from outside to inside the submerged portions of the filter media and into the effluent conduit;

e) a prime mover (for example, wind, solar, electric motor, with a chain and sprocket configuration) for rotating the one or more filtration members; and f) a blower and chamber for creating a reduced pressure condition in each of the one or more cleaning members when adjacent non-submerged portions of the filter media, the chamber configured to receive wet solids removed from non-submerged, wet solids-laden portions of the filter media by the one or more cleaning members subsequent to submerged, fouled portions of the filter media being rotated out of the filtration zone.

In certain embodiments the filtration members may comprise a single filter drum, while in certain other embodiments the filtration members may comprise one or more filter disks. In certain embodiments the systems may comprise two or more filters, for example, two or more filters having substantially the same filter media arranged in parallel flow relationship, or two or more filters having the same or different filter media arranged in series flow relationship, or combinations of parallel and series arrangements. In certain filter drum embodiments, a single cleaning member may be employed. In certain disk filter embodiments there may be a single cleaning member on each side of each filter disk, whereas in other embodiments one or more filter disks may have two or more cleaning members on a first side of the filter disks, and one or more cleaning members on a second side of the filter disks. Embodiments are also contemplated where the filter disks are all substantially the same size in width and radius.

A second aspect of the disclosure are processes for treating water or wastewater, one process embodiment comprising (or consisting essentially of, or consisting of):

a) flowing an influent water composition comprising water and solids into the filter tank;

b) producing an effluent stream by generating a pressure differential across submerged portions of the one or more filtration members, causing water in the influent water composition to flow from outside to inside the submerged portions of the one or more filtration members;

c) rotating the one or more filtration members so that wet, solids-laden submerged portions of the one or more filtration members become non-submerged, wet, solids-laden filtration member portions; and d) removing wet solids from at least some of the non-submerged, wet, solids-laden filtration member portions by reducing pressure in the one or more non-submerged cleaning members.

Certain process and system embodiments of this disclosure may operate in modes selected from the group consisting of automatic continuous mode, automatic periodic mode, and manual mode. In certain embodiments the one or more operational equipment may include prime movers selected from the group consisting of pneumatic, electric, fuel, hydraulic, and combinations thereof. It will also be appreciated that in certain embodiments, one or more of the one or more cleaning members may also move, and this movement may be before, during, or after the rotation of the filter media, and may be continuous, periodic, or oscillatory. The direction of movement of the cleaning members in drum filter embodiments is not limited, and, for example may be, but is not limited to transverse, longitudinal, or other orientation to the drum longitudinal axis. Direction of movement of cleaning members in disk filter embodiments may be radial, either away from or toward the disk center (or both), or translational across the disk surface in any number of directions or patterns (random or non-random).

These and other features of the systems and processes of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein, and vice versa. It should be further understood that wherever the term "comprising" is used herein, other embodiments where the term "comprising" is substituted with "consisting of" are explicitly disclosed herein, and vice versa. Moreover, the use of negative limitations is specifically contemplated; for example, certain systems may include a cleaning composition supply vessel, supply conduit, and one or more spray nozzles, while other systems may be devoid of these features. In certain embodiments the filter media may be devoid of filter cloth. As another example, a system may be devoid of a pump, an influent weir, or sludge handling features for removal of sludge that may build up in the bottom of the filter tank.

BRIEF DESCRIPTION OF THE DRAWINGS

The manner in which the objectives of this disclosure and other desirable characteristics can be obtained is explained in the following description and attached drawings in which.

Figure 1:
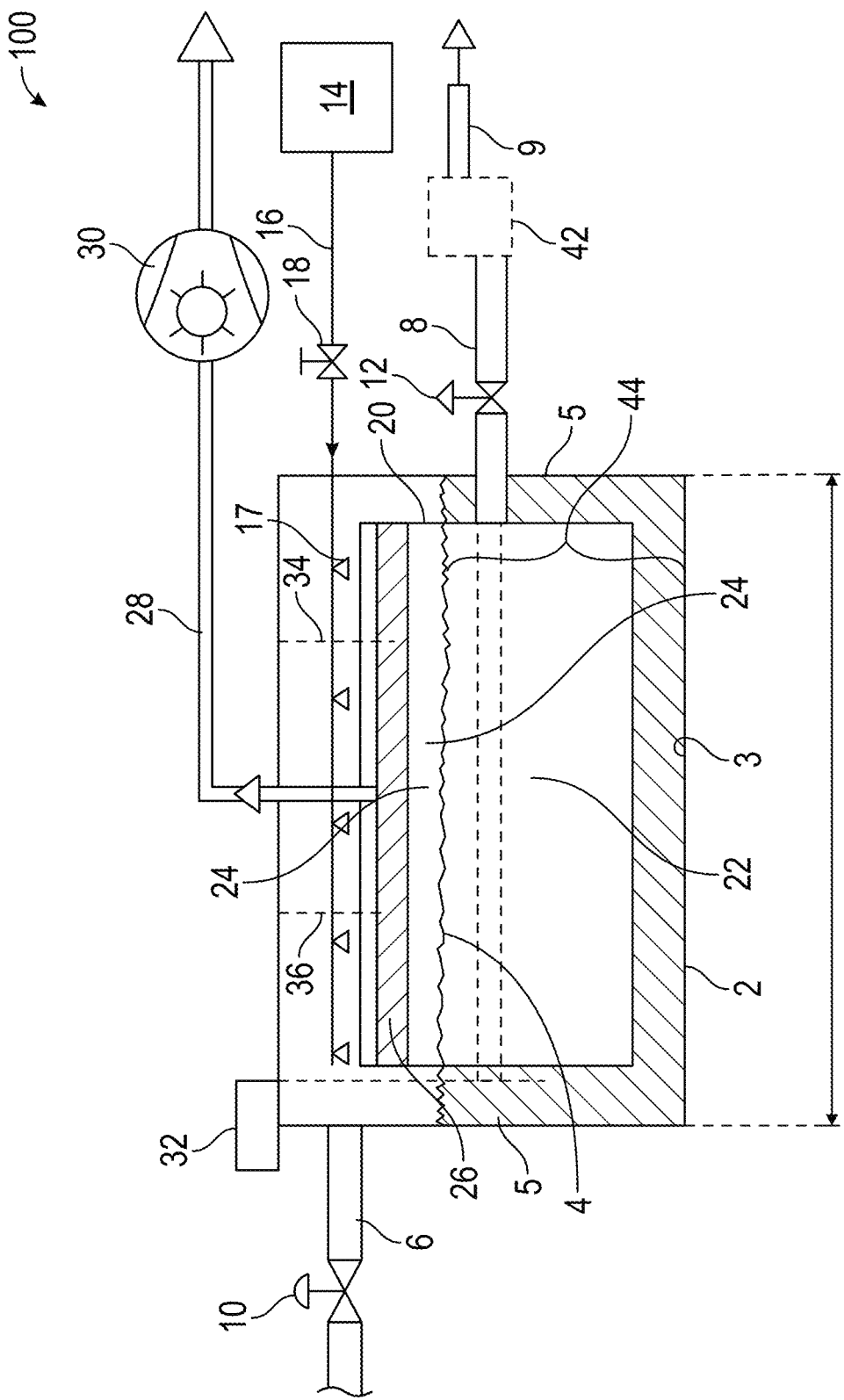
FIG. 1 is a high-level schematic diagrammatical representation of one system and process in accordance with the present disclosure.

It is to be noted, however, that the appended drawings are not to scale, and illustrate only typical system and process embodiments of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the systems and processes of the present disclosure. However, it will be understood by those skilled in the art that the apparatus, systems and processes disclosed herein may be practiced without these details and that numerous variations or modifications from the described embodiments may be possible. All technical articles, U.S. published and non-published patent applications, standards, U.S. patents, U.S. statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on volume and all test methods are current as of the filing date hereof. The acronym "ASTM" means ASTM International, 100 Barr Harbor Drive, PO Box C700, West Conshohocken, Pa., 19428-2959 USA. The acronym "EPA" means the United States Environmental Protection Agency. "Title 22" refers to Title 22 of California's Water Recycling Criteria, and refers to California state regulations for how treated and recycled water is discharged and used. "DDW 2014 Report" as used herein refers to State of California Water Boards, Division of Drinking Water publication "Alternative Treatment Technologies for Recycled Water—September 2014 Report."

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=R_L+k*(R_U-R_L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

The term "comprising" and derivatives thereof is not intended to exclude the presence of any additional component, step or procedure, whether or not the same is disclosed herein. In order to avoid any doubt, all systems, processes, and compositions claimed herein through use of the term "comprising" may include any additional component, step, additive, adjuvant, or compound whether monomeric, oligomeric, polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As mentioned herein, one of the challenges in operating presently known water and wastewater filtration systems is they are not able to use all media types (wire cloth, polymer mesh, pile cloth, woven cloth, felt, and other "deep" or "flat/thin" medias) with an outside-inside filtration path, nor do they offer non-submerged cleaning of the fouled side of the media except through pressure washing, which has many disadvantages as explained herein. Presently known systems and processes do not allow mechanical contact and level of 'suction' engagement to be managed to not damage or reduce damage to typically frail, flat absolute pore size medias (such as felt or thin wire mesh). Presently known systems and processes exhibit high 'backwash' rates, inadequate dewatering of the media, are limited in their process applications, and/or do not allow absolute pore size filtration or staged filtration (for example 100 micron belt, 10 micron nominal pile cloth, 1 micron felt) using substantially the same machine design. Furthermore, presently known systems and processes may not be able to handle upset conditions that may cause (in conventional filters) sudden and rapid increase in solids loading due to an 'upset' in an upstream process.

Systems and processes of the present disclosure enable the use of all media types (wire cloth, polymer mesh, pile cloth, woven cloth, felt, and other "deep" or "flat/thin" filter media) with an outside to inside filtration path and direct cleaning of the fouled side of the media. A comparison of operating conditions for different filter media is provided in Table 1. As used herein 'direct cleaning' means removal or extraction of wet solids from the filter media using one or more cleaning members without the cleaning members drawing filtered water through the filter media from the clean side to the fouled side, or using pressure washing to force filtered water through the filter media to dislodge accumulated solids and possibly damage the filter media. Systems and processes of the present disclosure allow mechanical contact and level of 'suction' (or pressure reduction) engagement to be managed to not damage or reduce damage to typically frail, flat 'finer and absolute pore size' medias. As used herein, 'absolute pore size media' refers to the rating of the media. As explained on the website of Quality Hydraulics & Pneumatics, Inc. (Mundelein, Ill., U.S.A.), the absolute rating, or cut-off point, of a filter is the diameter of the largest spherical glass particle which will pass through the filter. These diameter dimensions are expressed in micrometers—or one/one millionth of a meter. The absolute rating reflects the pore opening size of the medium. Filter media with an exact and consistent pore size have an exact absolute rating. This absolute rating should not be confused with the largest particle passed by a filter: the absolute rating simply determines the size of the largest glass bead that will pass through the filter under very low pressure differentials and non-pulsating conditions. Examples of such filter media are felt and thin wire mesh filter medias. Filter media with exactly consistent pore sizes do not typically exist in practice. Pore size is affected by the form of the filter element and is not necessarily consistent with the actual open areas. It is possible for the shape of the particle, say if it is cylindrical, to allow the particle to pass through a much smaller hole in the media than would have been expected, based on at least one of the particle's dimensions. This type of passage hinges on the size and shape of the opening and on the fluid depth over which filtering is provided. A filter bed is typically created wherein particles collect on the media surface and result in an increased blocking action. This further decreases the permeability of the element. The blocking can increase so much that the pressure drop across the filter becomes excessive and the flow rate through the system drops dramatically. The term absolute means that no particle larger than that rating can pass through the filter, which may limit the types of media to those with consistent pore size and ones that show a perfect retention of particles, an un-realistic expectation.

As further noted on the Quality Hydraulics & Pneumatics website, a 'nominal' rating indicates the filter's ability to prevent the passage of a minimum percentage of solid particles greater than the nominal rating's stated micron size. These particles of each specific contaminant are measured by weight. The nominal rating also represents an efficiency figure or degree of filtration. A nominal rating example is "95% of 10 micron"
  where the filter prevents 95% of all 10 micron and larger particles from passing through. However, the nominal rating method is generally discouraged. During testing, differing conditions like operating pressure and contaminant concentration vary enough that the rating provides an inconsistent result and a lack of uniform measurement.

As further noted by Quality Hydraulics and Pneumatics, Inc., a newer test procedure called multi-pass testing or Beta ratio testing yields readily comparable test results and was introduced to give the filter manufacturer and the end user an accurate comparison between filter media. Multi-pass testing uses a specified contaminate, of known sizes, added regularly in measured quantities to the fluid which is being pumped through the filter. At timed intervals, samples of the fluid are simultaneously taken from both downstream and upstream of the filter. Using particle counters, particles in each sample are measured and counted. Based on the results of these measurements, a Beta ratio is determined by dividing the number of particles of a particular size in the upstream flow by the number of particles of the same size in the downstream flow. In essence, the Beta ratio is an indicator of how well a filter controls a specifically sized particulate. For example, if one out of every two particles in a fluid pass through the filter, the Beta ratio is 2/1=2. This shows the number of particles upstream (2) divided by the number of particles downstream (1). Based on this method, filters with a higher beta ratio retain more particles, have a higher efficiency, and therefore are more effective filters.

Certain system and process embodiments of the present disclosure exhibit reduced cleaning rates compared with 'backwash' systems, improved dewatering, multiple process applications, absolute pore size filtration, staged filtration (for example a first filter employing 100 micron belt filter media, with the first filtrate feeding a second filter having 10 micron nominal pile cloth, and the second filtrate being fed to a third filter having a 1 micron felt) using substantially the same machine design.

Certain systems and processes of the present disclosure offer partial and gradual additional submergence of the filter media as head levels in the filter tank increase due to solids build up on the filter media. Furthermore, certain systems and processes of the present disclosure are able to handle upset conditions that may cause (in conventional filters) sudden and rapid increase in solids loading due to upset upstream processes, all while employing reduced piping, reduced valve sizes, reduced power, and reduced related equipment foot print compared with presently available systems, and which may eliminate the need for freeze protection.

In certain embodiments, filter tank level (FTL) may be sensed, and used to control suction (reduced pressure) management of the cleaning members. Different systems and processes of the present disclosure may have different sensor strategies, for example, a mass flow sensor for the influent flow and a FTL sensor; or a TL sensor used to control energizing or initiating additional cleaning members of a system employing multiple cleaning members. All combinations of sensing one or more of FTL, temperature, turbidity, concentration, particle count, and mass flow of one or more flowing streams and the influent in the filter tank are disclosed herein and considered within the present disclosure.

Certain systems may include FTL management components and associated components, for example, but not limited to pressure (or vacuum, or reduce pressure) control devices (backpressure valves), pressure relief devices (valves or explosion discs), level control valves, expansion valves, pipes, conduits, vessels, tanks, mass flow meters, temperature and pressure indicators, heat exchangers, pumps, compressors, and blowers as described herein. With respect to "reduced pressure management", when referring to the degree of vacuum or reduced pressure exhibited in the cleaning members, those skilled in the art will understand that the lowest degree of reduced pressure that will effectively clean the filter media is desired, for sake of energy efficiency, but the reduced pressure may, in some embodiments, be about 13 psia (90 kPa) or less; alternatively about 12 psia (83 kPa) or less; alternatively about 11 psia (76 kPa) or less; alternatively about 10 psia (69 kPa) or less; alternatively about 10 psia (70 kPa) or less; alternatively about 9 psia (63 kPa) or less; alternatively about 8 psia (56 kPa) or less; alternatively about 7 psia (49 kPa) or less; alternatively about 6 psia (42 kPa) or less; alternatively about 5 psia (35 kPa) or less. All ranges and sub-ranges (including endpoints) between about 14.69 psia (about 101.3 kPa) and about 0.01 psia (about 0.07 kPa) are considered explicitly disclosed herein. As used herein with respect to pressure reduction below atmospheric pressure, "about" means+/−1 psia (+/−6.9 kPa).

Certain systems of this disclosure include those wherein the one or more filtration members is a single drum filter. In certain of these drum filter systems, the one or more cleaning members is a single cleaning member comprising a body having a length (L) and a width (W), the length (L) of the cleaning member corresponding substantially with a length of the drum filter (DFL). In certain drum filter system embodiments, the length (DFL) of the filter drum and a length of the filtration zone inside the filter tank (FTL) are related by a ratio ranging from about 1:2 to about 9:10. In certain other drum filter systems the one or more cleaning members may comprise a set of cleaning members, each comprising a body having a length (L) and a width (W), a first sub-set of the set of cleaning members positioned so that their combined length $(L_11+L_12+L_13+L_1n)$ corresponds substantially with the length of the drum filter (DFL), and a second sub-set of the plurality of cleaning members positioned behind the first sub-set such that a length ($L_2$) of each of the second sub-set overlaps a position where two of the first sub-set of cleaning members have abutting ends. In yet other drum filter systems the one or more cleaning members comprises first and second cleaning members, each cleaning member comprising a body having substantially same length (L) and a width (W), the length (L) of the first and second cleaning members corresponding substantially with a length of the drum filter (DFL). It is understood herein that the term "length" is a larger numerical quantity than the term "width."

In certain systems and processes of the present disclosure the one or more filtration members may comprise a plurality of filter disks, where a "disk" is a 3D circular structure having a radius (r) much more than its width (w). In certain systems each of the one or more filter disks has equal width (w) and radius (r). In certain disk filter embodiments the one or more cleaning members may comprise a first set of cleaning members, one of the first set of cleaning members positioned on a first side of each of the plurality of filter disks, and a second set of cleaning members, one of the second set of cleaning members positioned on a second side of each of the plurality of filter disks. In other disk filter embodiments, the one or more cleaning members may comprises a first set of cleaning members, at least two of the first set of cleaning members positioned on a first side of each of the plurality of filter disks, and a second set of cleaning members, at least one of the second set of cleaning members positioned on a second side of each of the plurality of filter disks.

In certain systems of the present disclosure the one or more cleaning members may be fluidly connected with the blower and chamber by a cleaning conduit for creating the reduced pressure condition in each of the one or more cleaning members when non-submerged.

Certain systems of the present disclosure may further comprise a cleaning composition supply vessel, a cleaning composition supply conduit fluidly connecting the cleaning composition supply vessel with a set of spray nozzles positioned to spray a cleaning composition onto at least some of the non-submerged portions of the filtration members, and a cleaning composition supply valve in the cleaning composition supply conduit.

In certain systems and processes of this disclosure, efficiency of filtration may be characterized by turbidity and silt density index (SDI) of the filtrate. SDI is a measurement of the fouling potential of suspended solids, and may be determined by test method ASTM D4189-07(2014). Acceptable values depend on the filter media and even the filter media manufacturer of the "same" media, as well as temperature of the water being tested. Turbidity is a measurement of the amount of suspended solids. SDI and turbidity are not the same and there is no direct correlation between the two. According to the Water Treatment Guide, a publication of Applied Membranes, Inc., in practical terms, however, many filter media show very little fouling when the feed water has a turbidity of less than 1 NTU. Correspondingly these filter media show very low fouling at a feed SDI of less than 5. SDI may be reduced by injecting a coagulant that is compatible with the filter media, before the media filter. A dispersant may keep particles from fouling the media.

A wide variety of probes are available to measure turbidity—the degree to which light is scattered by particles suspended in a liquid. The measured turbidity, however, depends on the wavelength of light and the angle at which the detector is positioned. Turbidity values of the effluent (filtrate) may range from about 0.0005 to about 800 NTU, or from about 0.0010 to about 700 NTU, or from about 0.0020 to about 650 NTU, or from about 0.0050 to about 600 NTU, or from about 0.01 to about 500 NTU. "NTU" refers to "Nephelometric Turbidity Unit" (NTU) and employs a sensor that measures scattered light at 90 degrees from an incident white light beam, according to EPA method 180.1.

As noted herein, one system embodiment may comprise, for example, a first filter using 100 micron belt, a second filter using a 10 micron nominal pile cloth, and a third filter using a 1 micron felt, using substantially the same machine design for each filter.

In certain systems and processes of the present disclosure, the process may self adapt' to the thickness of the filter media material in terms of liquid waste generated. This concept became evident when performing pilot unit tests and comparing the test results to commercially known filters and backwash systems.

The condition (clarity, turbidity, and/or concentration of an impurity) and flow rate of the influent stream and the specific configuration of the system largely define the operational capabilities of each process and system embodiment. Redundancy of components (pumps, valves, sensors, and the like) may allow for extended service periods and mitigates risk of downtime due to component failure. An example would be a pressure control device plugging with material, or a pump failure, or a filter drum or one or more filter disks taken out of service for inspection. In this case, isolating the failed or to be inspected component and enabling another one allows for continued operations, and enables evaluation and/or modification of the operational parameters to minimize the risk of failure of the new or parallel components in use.

The systems and processes of this present disclosure may be used for new greenfield applications, where one or more filter units are custom designed together to be operatively and fluidly connected during operation. It is also contemplated to design the systems and processes to be able to operate in dual modes, where in the first mode the filter unit is integrated with another process (such as a clarifier or membrane unit), and the second mode where one or both of the units may operate independently from each other, in other words, where either one or both of the filter unit and the clarifier or membrane unit may operate without requiring the other unit to be in operation.

Advantageously, most of the components of systems and processes of the present disclosure may alternatively be sourced from existing pieces of equipment that, individually, may be familiar to those in the filtration industry. Some of the components of the systems of the present disclosure may be based on existing equipment, some of which may require modification to reconfigure the equipment for integrated operation between a filter unit of the present disclosure and another unit, such as a clarifier or membrane unit. The installation of systems and processes of the present disclosure on existing clarifier or membrane units (or other separators, such as centrifuges) are expected to require minimal interfacing. It may be possible to design a retrofitted system that requires no modifications to the other units, although the designer may consider modest changes, for example, substituting less expensive membrane units, or other new internals for existing internals. New equipment to complete the integration of a system of the present disclosure may include vacuum (reduced pressure) conduits, a blower, and a pump, the filter tank, and the filter media (drum or one or more disks). It is of course contemplated to employ a drum filter of the present disclosure in conjunction with a disk filter of the present disclosure, such "compound" arrangements may be in series or parallel (or combination) configuration.

Processes and systems of the present disclosure often are end of line (in other words downhill of the plant) in which case there is no pump at all and the entire until will be low power/solar capable. Embodiments where the blower discharge is used to 'pneumatically' rotate the drum or disk arrangement are contemplated, as are embodiments where the blower discharge is used to push or pump the small volume of waste uphill via an air-lift if needed. Other embodiments may be operated using hydraulic, electric, solar, geothermal, pneumatic, or combustion power, or combination of one or more of these. One possible configuration may employ traditional electric power to operate a motor for a pump (which motor may be variable speed or non-variable speed) and solar electric power to operate the reduced pressure generator (blower) and to operate the motor that rotates the drum or disk filtration members. Power supplies may have redundant and/or back up power supply. In certain embodiments, electric power may require installation of an additional battery unit, possibly including solar panels for backup power. In certain embodiments, a plant may have one or more hydrocarbon-powered electric generators, and these units may provide electric power, and backup power may be provided by an uninterruptible power supply (UPS) battery system.

Certain embodiments may include 1) low power electric connections for data transmission for sensors (e.g., pressure, temperature, tank level, mass flow indicators, particle counters, among others); and 2) electric cable to provide power for operating valves and other components of the systems and processes. With respect to data connection/integration, in certain embodiments control signals for the components of the systems of the present disclosure, as well as parameters measured or captured by the system's sensors, may be transmitted to and from an operator room or control room from and to the filter.

Referring now to the drawing figures, FIG. 1 is a high-level schematic diagrammatical representation of one system and process embodiment 100 in accordance with the present disclosure. Embodiment 100 includes a filter tank 2 having a floor 3, a sidewall structure 5, and a maximum water level 4, an influent conduit 6 including an optional influent flow control valve and/or tank level control valve 10 (depending on the process control scheme used), a low-pressure effluent conduit 8 having an optional effluent flow control valve 12, and a drum filter (sometimes referred to as a filter drum) 20 having a submerged filter media portion 22 and a non-submerged filter media portion 24. Embodiment 100 may further include an optional pump 42 fluidly connected to the low pressure effluent conduit 8 and to a high-pressure conduit 9, which directs effluent to another unit operation, or another filter, or storage facility (not illustrated). Low-pressure effluent conduit 8 extends through drum filter 20 and mechanically connects on a distal end with a motor/chain/sprocket assembly 32, which rotates drum filter 20. Low-pressure effluent conduit 8 includes a plurality of slots, holes, or other through-holes extending from its external surface to its internal surface in known fashion, creating the differential pressure on the filter media covering the filter drum. As this is well-known and not part of the present disclosure, it is not discussed further herein.

Still referring to FIG. 1 and the high-level schematic diagrammatical representation embodiment 100, filter tank floor 3 and sidewall structure 5, along with maximum water level 4, form or define a filtration zone 44 that actually increases during operation of the filter. The filtration path will be outside-inside with solids collecting on the outside of the filter media on the submerged portions 22 of the filter media. As a solids layer builds, the water level in filter tank 2 will increase submerging more active filter media. At a predetermined maximum water depth 4 or time interval, the wet, solids-laden filter media is cleaned by:

1. Energizing an air suction device 30 capable of handling an air and water mixture through a cleaning conduit 28 and one or more cleaning members 26 (similar to dental suction or wet/dry vacuums or "shop-vacs").

2. Rotating filter drum 20 (or discs 21 in accordance with other embodiments) to unsubmerged the fouled media and clean the media of collected solids and remove entrapped water from the media employing suction cleaning member(s) 26, and which further cleanse the media with ambient gases (air) from the clean side (inside) of the non-submerged portion 24 of the filter media. The filter media may be cleaned with multiple passes and/or with numerous cleaning members 26 in sequence. Cleaning member 26 may optionally be supported by support struts 34, 36, illustrated in phantom in FIG. 1.

Figure 18:
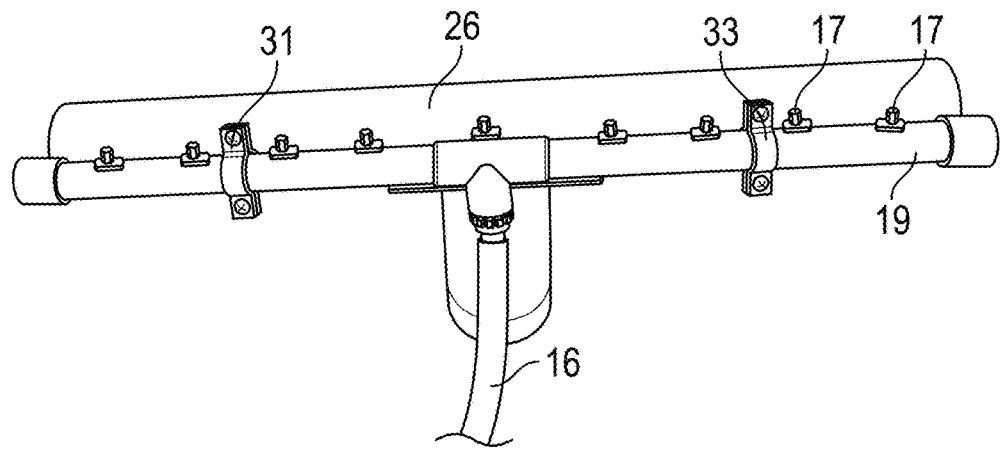
FIG. 18 is a schematic illustration of one embodiment of a cleaning composition spray bar attached to a cleaning member.
Figure 19:
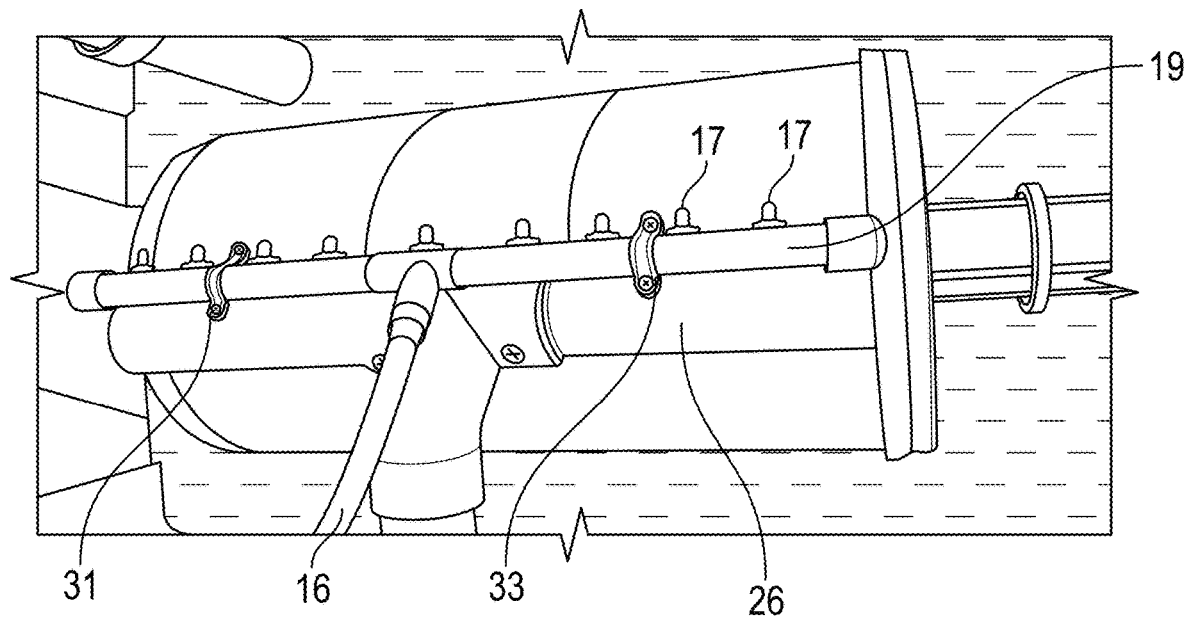
FIG. 19 illustrates how the cleaning member and spray bar may be positioned while cleaning a filter drum.

3. If desired, the fouled media maybe treated with cleaning agents (which may be liquid, gas, aerosol, or combinations thereof) as a part of the filter media cleansing process, employing a cleaning composition applied from a cleaning composition supply vessel 14, cleaning composition supply conduit 16 and supply valve 18. Conduit 18 includes, in certain embodiments, one or more spray nozzles 17 attached to a spray bar 19. FIGS. 18 and 19 illustrate schematically one embodiment of a cleaning composition spray bar 19 with 9 spray nozzles 17 evenly spaced across spray bar 19, the latter attached to cleaning member 26 using a pair of U-brackets 31, 33. There may of course be less or more than 9 nozzles, and they need not be evenly spaced, or even in the same line along the spray bar. The spray bar itself may not be necessary, as one could conceive of embodiments where the nozzles are each individually attached to the cleaning member, or not attached but held in position by dedicated brackets. In the embodiment illustrated in FIGS. 18 and 19 the spray bar and nozzles are positioned aft of the cleaning member, but that is not required in all embodiments. The aft position appears to work best for the cleaning solution to be applied post extraction of fluid so the applied cleaner agents are not diluted and are able to wick and penetrate the depth of the media. This may prove especially useful in applications that may sometimes see oil and grease (which is a problem at some plants) as well as for behind fixed film biological treatment plants such as MBBR and Trickling filters as those sorts of bacterial films tend to attach to and grow on the filter media too. Being able to extract free liquid and kill/sterilize those sorts of highly adherent bio-films with a low waste volume generating process will be a large step forward for this type of filtration.

In contrast to previously known systems and processes, the initial cleaning media is air (a gas), not filtered water (a liquid); applied suction (reduced pressure) is used, applied directly to the soiled side or portion of the filter media which is non-submerged. This is not, therefore, a 'backwash' but a unique cleaning arrangement suitable for use with any filter media type (for example, but not limited to woven mesh, nonwoven, pile fabric, felt). Moreover, the arrangement allows for direct access to the non-submerged 'dirty-feed side' of the media for cleaning and/or application of cleaning agents (for example, but not limited to, oxidizers, biocides, surfactants, acids, bases, chelating agents, solvents, steam, or combination thereof) as a part of the cleaning process.

In certain system and process embodiments, it may be desirable to operate the drum filter or filter disks, while filtering, 'fully submerged' and then periodically partially drain the filter tank, followed by initiating a cleaning event to clean non-submerged portions of what then becomes partially submerged filter media, but only during one or more cleaning events or cycles. In these embodiments the cleaning member(s) would either be submerged during filtering, but become non-submerged when the tank level is decreased; alternatively, the cleaning member(s) may be movable so that they could be moved to a non-submerged position away from the filter drum or filter disks, and then moved into position to clean the fouled filter media after the tank level is decreased sufficiently. These embodiments are considered within the present disclosure. Another advantage of systems and methods of this disclosure is the fact that they are not subject to run dry interruption. With fully submerged filters if a low flow, high solids event is experienced the filter backwash rate can exceed the forward feed rate and create a low-level shut down of the backwash pump to prevent running dry which can be problematic for the process should it be followed by a hydraulic surge (such as a lift station pump kicking on). Systems and processes of the present disclosure have the ability to clean the media with no forward flow, but also the ability to completely clean and nearly dry the media in an empty tank should one wish to clean the media for long periods of non-use which is sometimes the case for storm water applications. Otherwise the media sits in water or fully saturated either of which causes biomass to grow in and on the filter media without the ability to remove it.

FIGS. 2-5 are highly schematic illustrations, with parts cut away, of four other system and process embodiments 200, 300, 400, and 500, respectively in accordance with the present disclosure. In each of embodiments 200, 300, 400, and 500, influent enters and effluent leaves the unit in substantially the same fashion, with only the filter media cleaning mechanisms being different, and embodiments 200 and 300 are drum filter embodiments, while embodiments 400 and 500 are filter disk embodiments.

Figure 2:
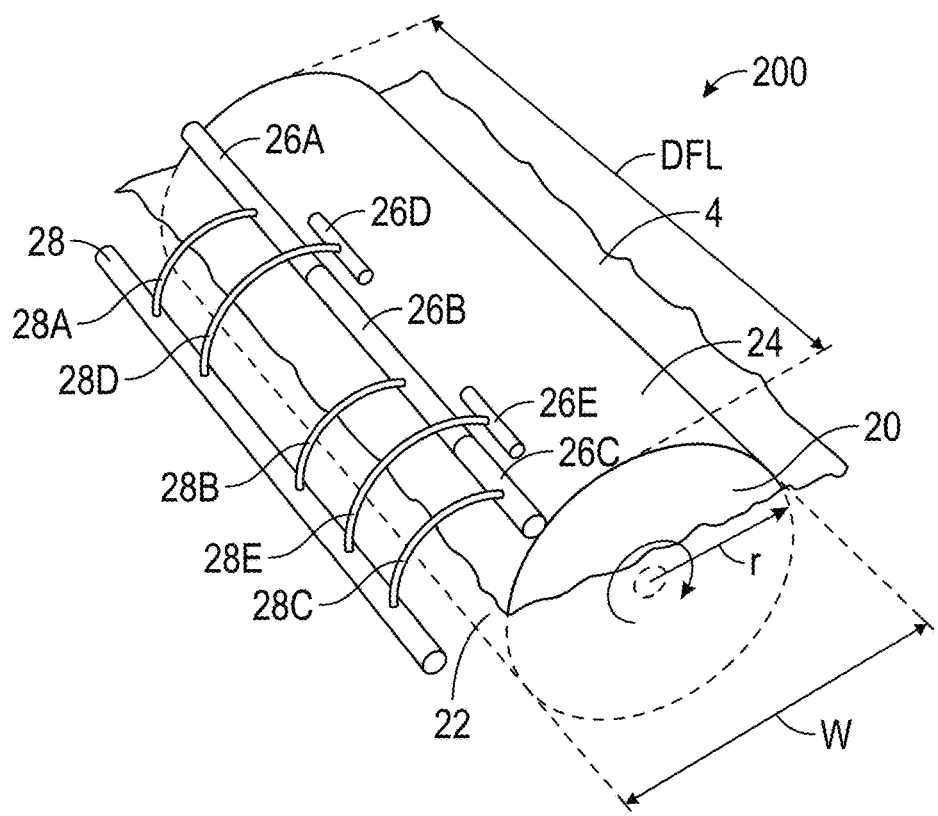
FIGS. 2-5 are highly schematic illustrations, with parts cut away, of four other system and process embodiments in accordance with the present disclosure.

Referring to FIG. 2, embodiment 200 features a filter drum 20 having submerged portions 22 and nonsubmerged portions 24 separated by water level 4, a drum filter length (DFL), width (W), and radius (r), and a first sub-set of cleaning members 26A, 26B, and 26C arranged in abutting end relationship such that the sum of the lengths $L_{26A}+L_{26B}+L_{26C}$ is substantially equal to DFL. A second sub-set of cleaning members 26D and 26E are arranged and positioned behind points 27A and 27B, respectively, so as to collect debris and water potentially missed by abutting cleaning members 26A and 26B, and abutting cleaning members 26B and 26C. Each of cleaning members 26A, 26B, 26C, 26D, and 26E is fluidly connected to a cleaning conduit header 28 by respective cleaning sub-conduits 28A, 28B, 28C, 28D, and 28E, which may be flexible or non-flexible. Filter drum 20 rotates in the direction of the curved arrow in this embodiment; however, the direction of rotation may be reversed or alternated in certain embodiments.

Figure 3:
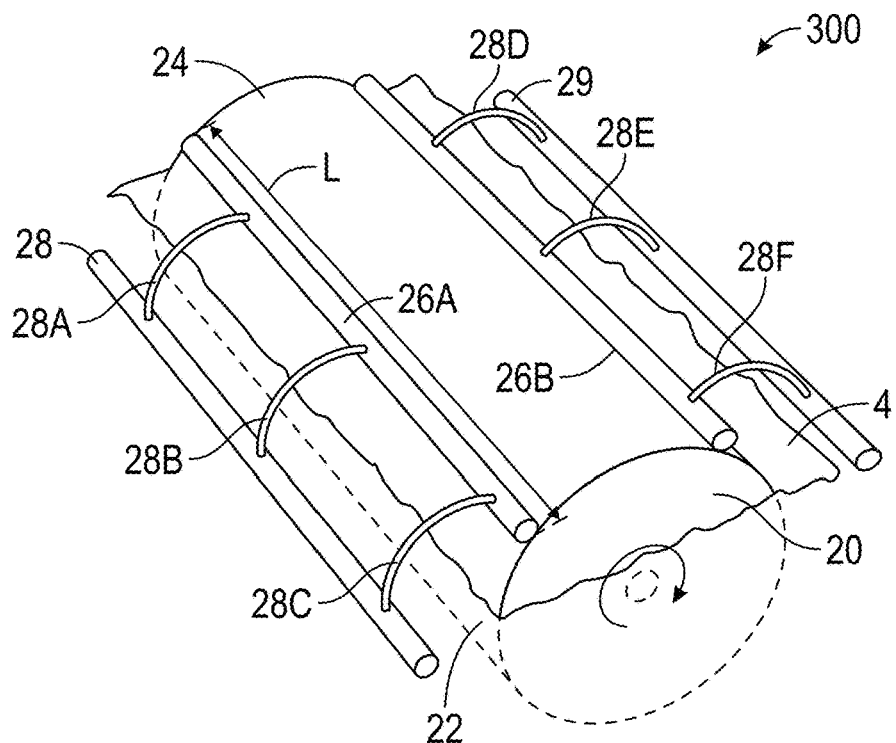

Referring to FIG. 3, embodiment 300 also features a filter drum 20 having submerged portions 22 and nonsubmerged portions 24 separated by a water level, a drum filter length (DFL), width (W), and radius (r), however, embodiment 300 features a first cleaning member 26A and a second cleaning member 26B, each cleaning member 26A, 26B having a length (L) substantially equal to the drum filter length (DFL). Cleaning member 26A is fluidly connected to a cleaning conduit header 28 by respective cleaning sub-conduits 28A, 28B, and 28C substantially equidistant from each other, and which may be flexible or non-flexible. Cleaning member 26B is fluidly connected to a cleaning conduit header 29 by respective cleaning sub-conduits 28D, 28E, and 28F substantially equidistant from each other, and which may be flexible or non-flexible. Filter drum 20 rotates in the direction of the curved arrow in this embodiment; however, the direction of rotation may be reversed or alternated in certain embodiments. In this embodiment, cleaning conduits 28 and 29 may be fluidly connected to the same or different air suction devices (not illustrated).

Figure 4:
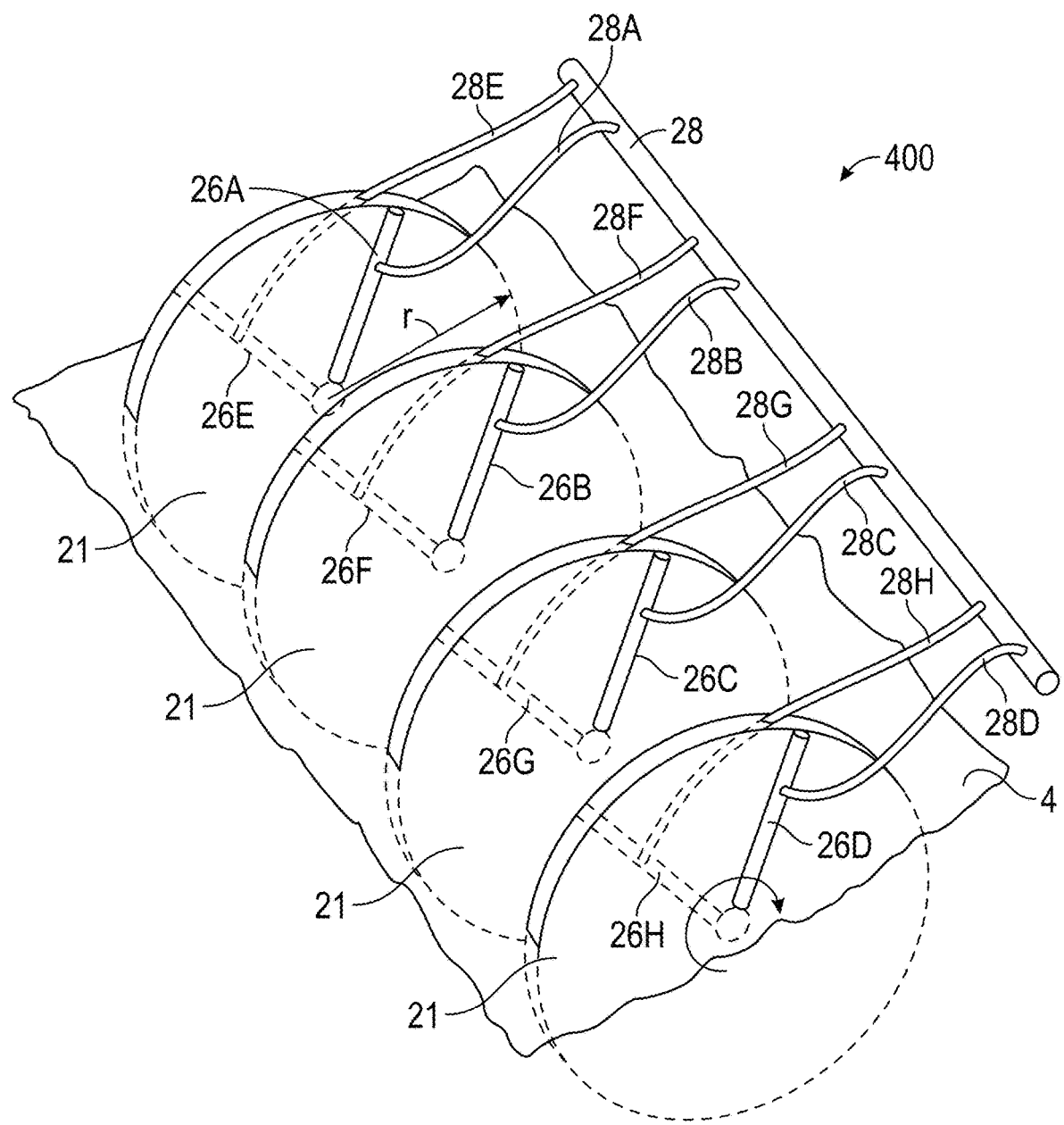

FIG. 4 illustrates filter disk embodiment 400. Embodiment 400 features four disks 21, although the number may vary up or down depending on the application. Each filter disk 21 is serviced on a first side by one of a first sub-set of cleaning members 26A, 26B, 26C, and 26D, each of which is fluidly connected to cleaning conduit header or manifold 28 by respective cleaning conduits 28A, 28B, 28C, and 28D. A second sub-set of cleaning members 26E, 26F, 26G, 26H, services a second side of each cleaning disk, each cleaning member fluidly connected to cleaning conduit 28 by respective cleaning conduits 28E, 28F, 28G, and 28H. All conduits may be flexible or rigid as desired. Each disk has a disk radius (r) that is substantially the same for each filter disk, although that is not strictly required.

Figure 5:
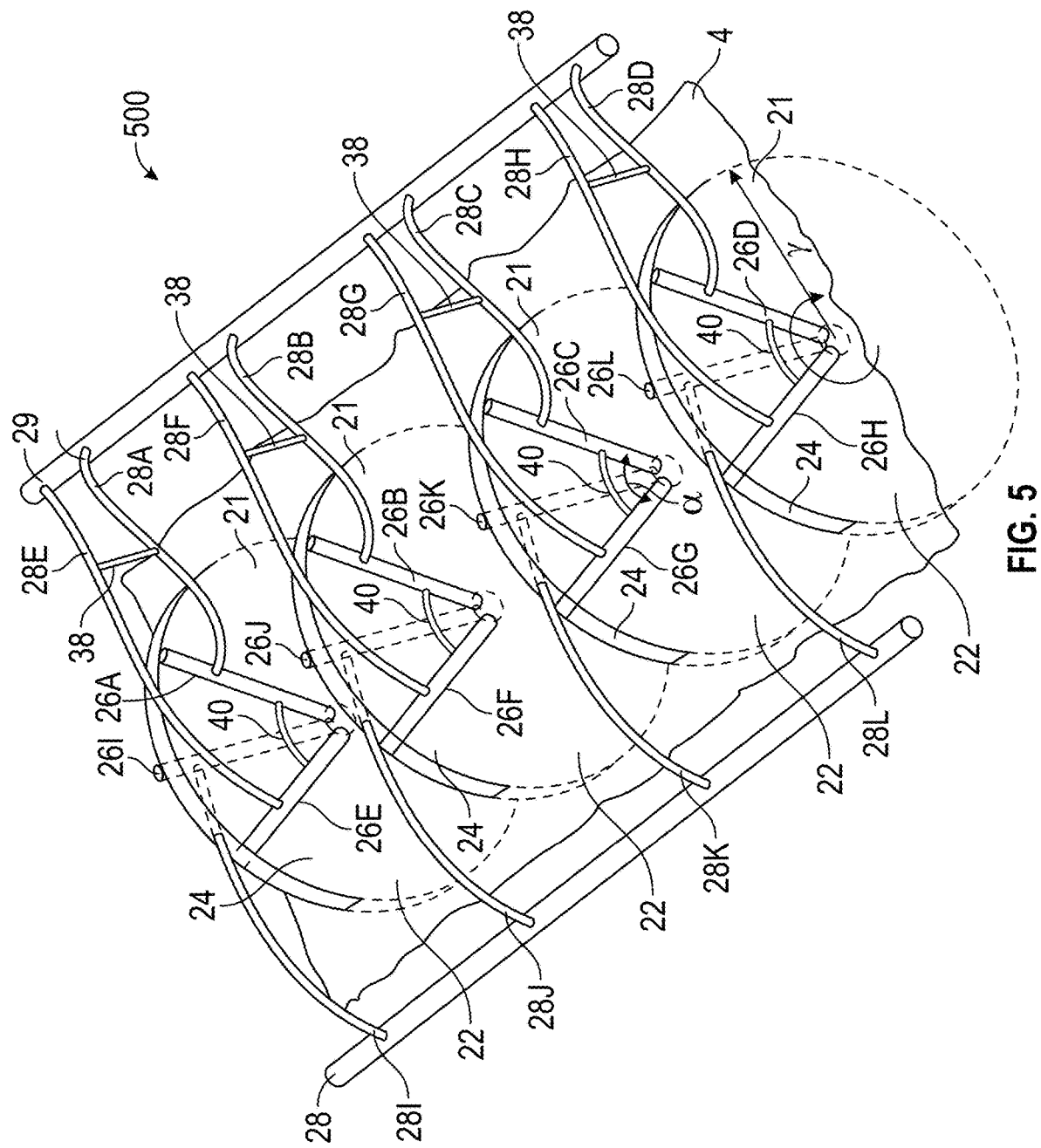

FIG. 5 illustrates schematically another disk filter embodiment 500, and illustrates additional optional features of systems of the present disclosure. Embodiment 500 features four disks 21, although the number may vary up or down depending on the application. Each filter disk 21 is serviced on a first side by two of a first sub-set of cleaning members 26A, 26B, 26C, 26D, 26E, 26F, 26G, and 26H, each of which is fluidly connected to cleaning conduit header or manifold 29 by respective cleaning conduits 28A, 28B, 28C, 28D, 28E, 28F, 28G, and 28H. A second sub-set of cleaning members 26I, 26J, 26K, 26L, services a second side of each cleaning disk, each cleaning member fluidly connected to cleaning conduit 28 by respective cleaning conduits 28I, 28J, 28K, and 28L. All conduits may be flexible or rigid as desired. Each disk has a disk radius (r) that is substantially the same for each filter disk, although that is not strictly required. Cleaning members 26A and 26E are offset by an angle ($\alpha$) and connected by an optional arch support bracket 40, as are cleaning members 26B and 26F, cleaning members 26C and 26G, and cleaning members 26D and 26H. Each angle (α) may be the same or different, but for easy of construction, installation, and replacement, the angles may be the substantially same angle. The angle (α) may range from about 20 degrees to about 180 degrees. Embodiment 500 also illustrates use of optional linear support brackets 38, which may help support cleaning conduit pairs 28A and 28E, 28B and 28F, 28C and 28G, and 28D and 28H, as illustrated schematically in FIG. 5.

Figure 6:
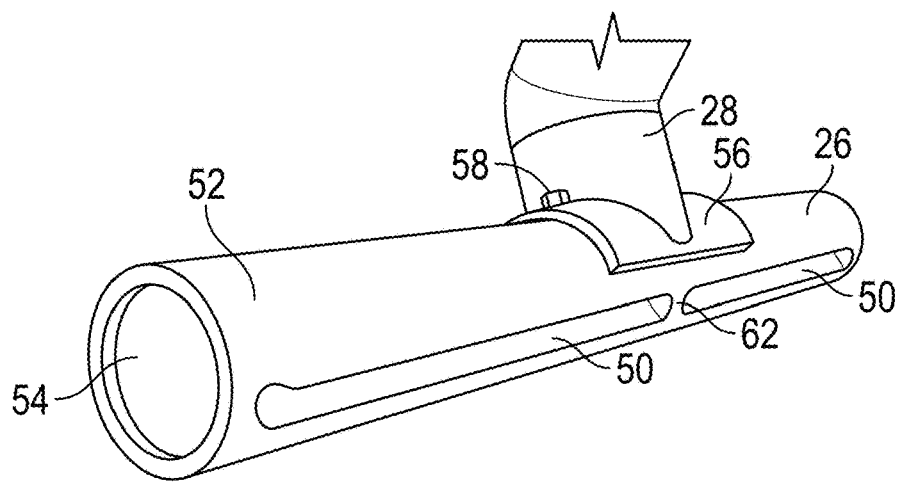
FIGS. 6, 7, and 8 are schematic illustrations of various views of one embodiment of a cleaning head in accordance with the present disclosure.
Figure 7:
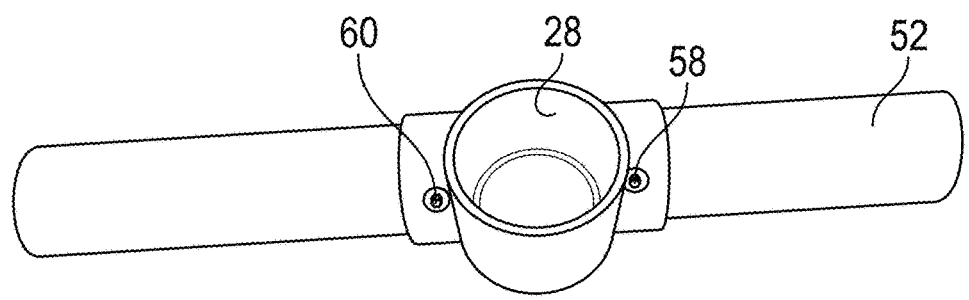
Figure 8:
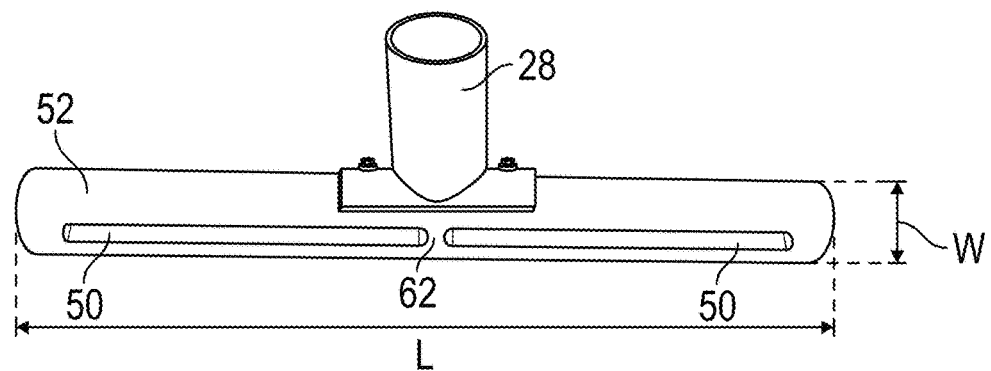

FIGS. 6, 7, and 8 are schematic illustrations of various views of one embodiment of a cleaning head in accordance with the present disclosure, while FIGS. 9-13 are schematic illustrations of one filter drum assembly and components thereof, including two embodiments of rotating couplings allowing conveyance of fluid from the interior of the drum while it is under rotation, useful in systems and processes of the present disclosure. FIGS. 14-17 are schematic illustration of another filter drum embodiment, including schematic illustration of one possible suction unit.

Referring to FIGS. 6-8, cleaning head 26 comprises a body 52 having a length (L) and a width (w), and having two longitudinal suction slots 50 separated by a central bracket 62. Body 52 is generally cylindrical in this embodiment, but that is not necessary in all embodiments, nor need slots 50 be longitudinal in all embodiments. For example, slots 50 could be a series or pattern of smaller slots, or even round or other shape holes. Body 52 includes two end caps 54 at its opposite ends (one is not viewable in FIGS. 6-8). A half- or quarter-cylindrical bracket 56 is attached with two screw/washer assemblies 58, 60, and this bracket fluidly and mechanically connects body 52 with cleaning conduit 28. In the embodiment illustrated in FIGS. 6-8, all components except the screw/washer assemblies 58, 60 may be plastic, such as PVC, or metal such as carbon steel or stainless steel, or aluminum if weight is a consideration. Some other exotic metal may also be used in corrosive environments, such as brass, copper, or monel.

Figure 9:
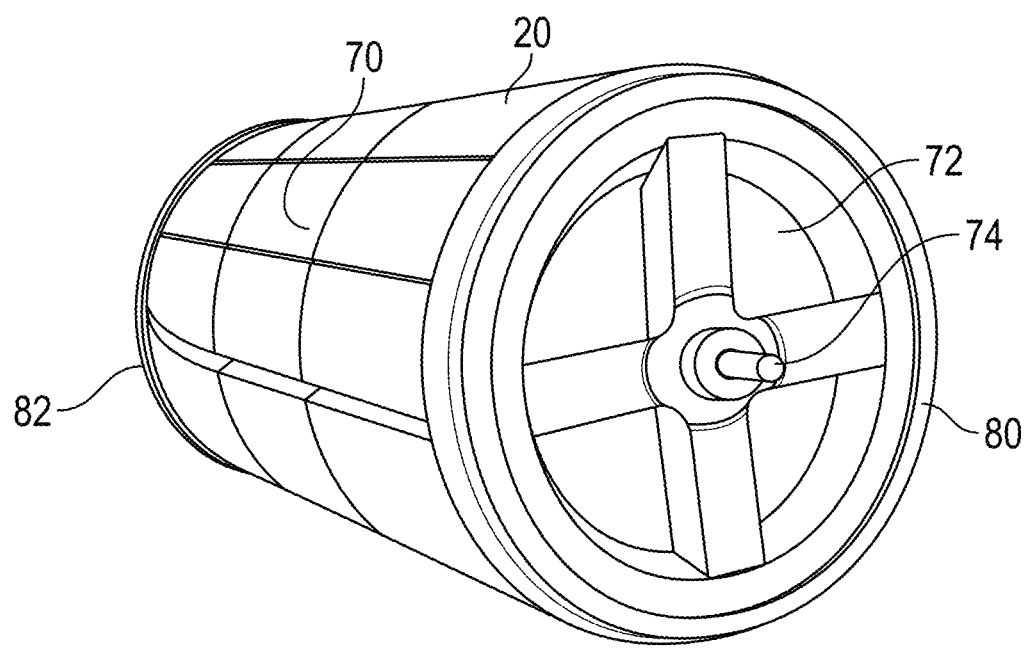
FIGS. 9-13 are schematic illustrations of one filter drum assembly and components thereof, including two embodiments of rotating couplings allowing conveyance of fluid from the interior of the drum while it is under rotation, useful in systems and processes of the present disclosure.
Figure 10:
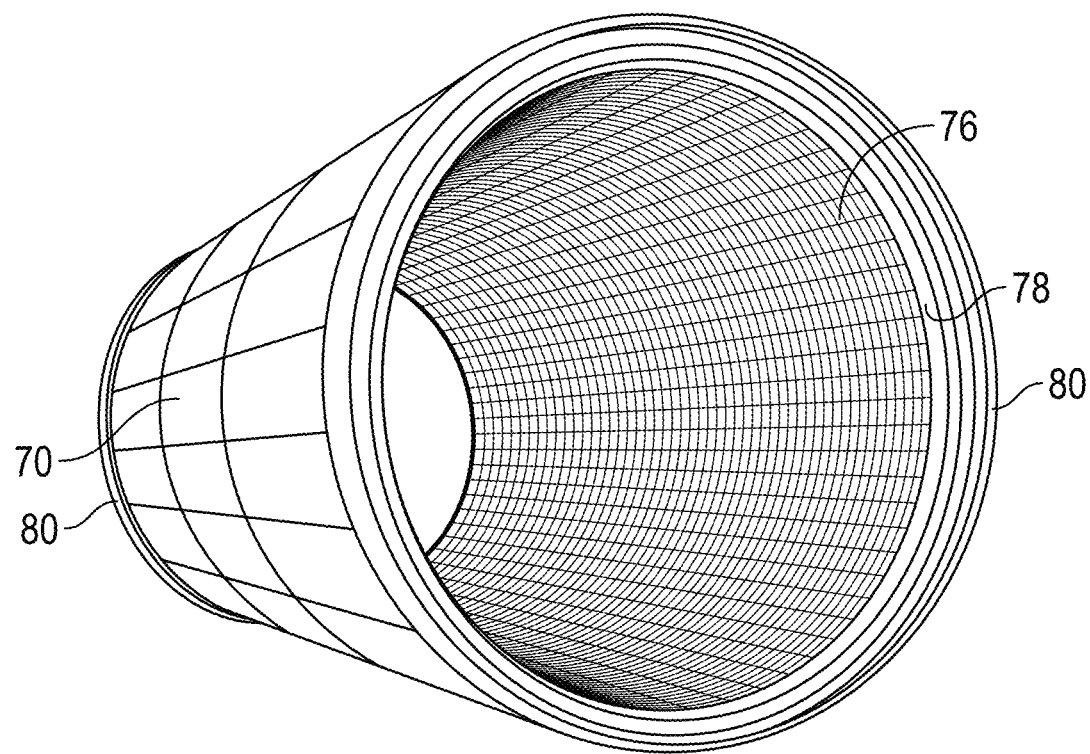
Figure 11:
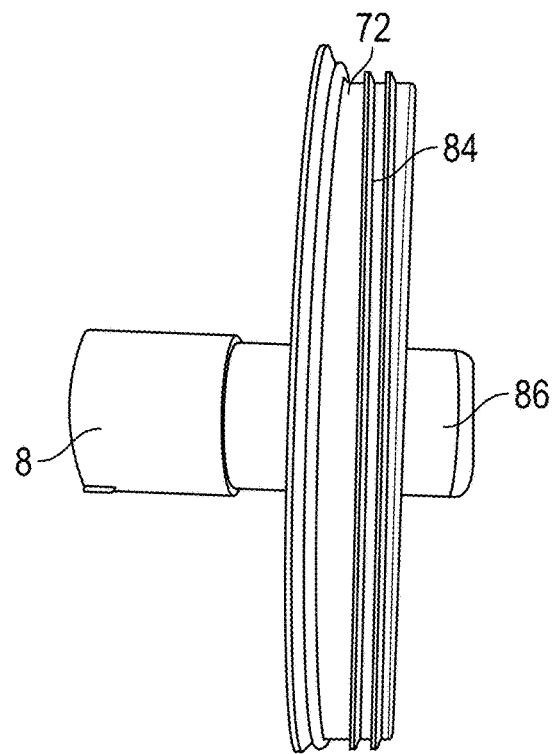
Figure 12:
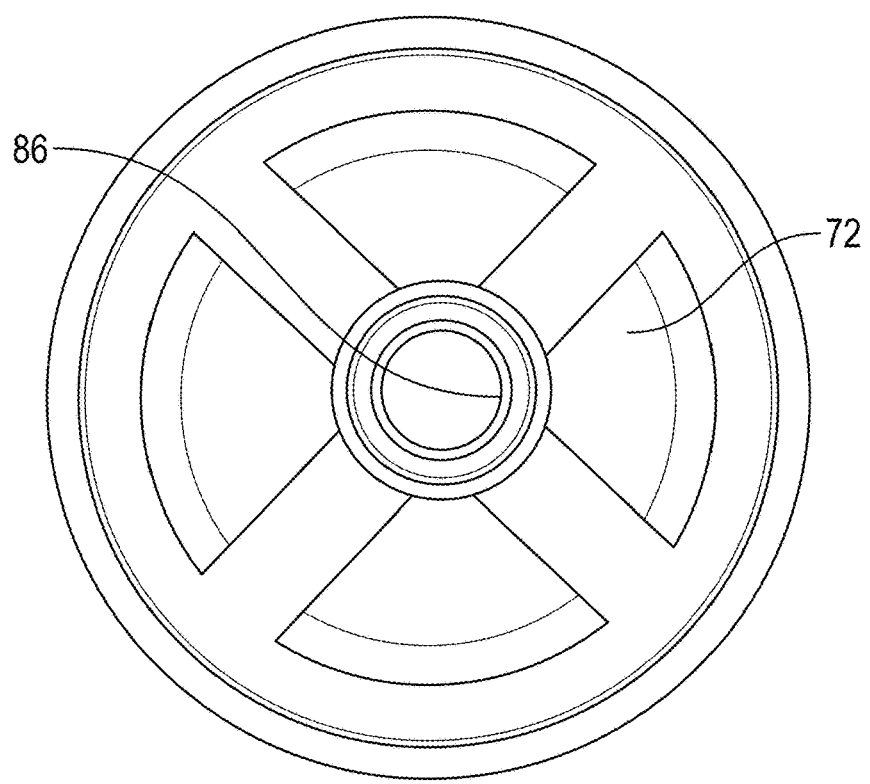
Figure 13:
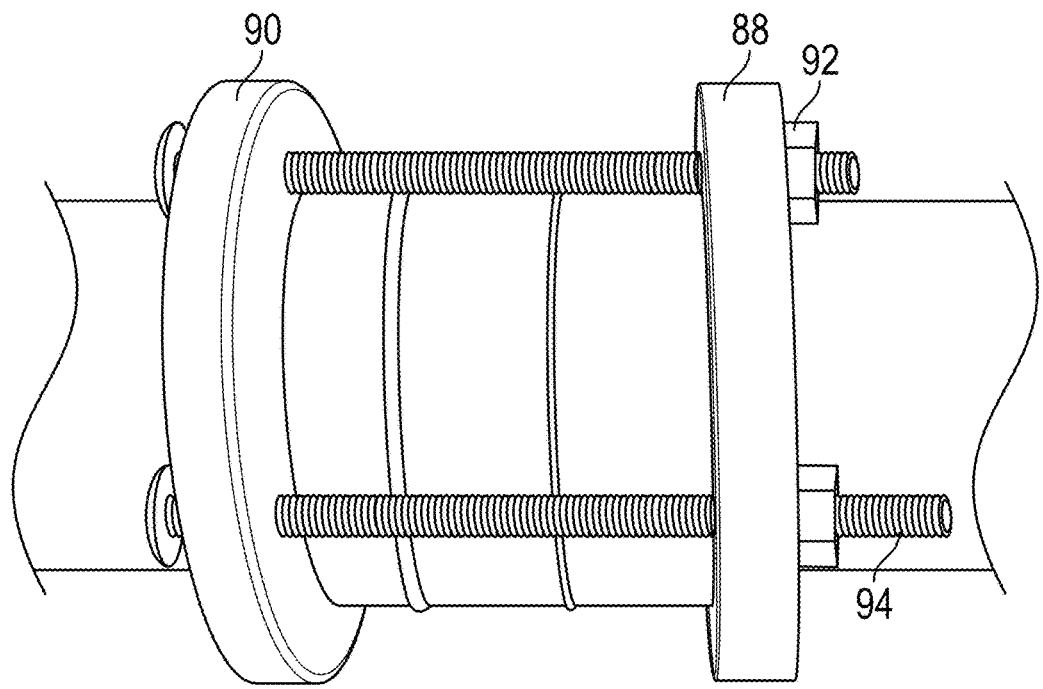

FIGS. 9 and 10 illustrate schematically a filter drum 20 useful in the systems and processes of the present disclosure, illustrating a pile cloth filter media 70, a proximal end filter drum head 72, and a distal end filter drum head 73 (not viewable in FIGS. 9 and 10). FIG. 9 illustrates an axle assembly 74 (explained further in reference to FIGS. 11 and 12), while FIG. 10 illustrates a screen support 76 that supports pile cloth filter media 70. FIGS. 9 and 10 also illustrate schematically two filter drum end rings 80, 82, each having in this embodiment internal threads 78 that mesh with external threads 84 on filter drum heads 72, 73. An integrated rotating pipe coupling 86 is illustrated in FIGS. 11 and 12, while a non-integrated rotating pipe coupling is illustrated in FIG. 13, the latter comprising an internal flange 88, and an external flange 90 secured together using nut and bolt assemblies, two of which are illustrated at 92, 94 in FIG. 13.

Figure 14:
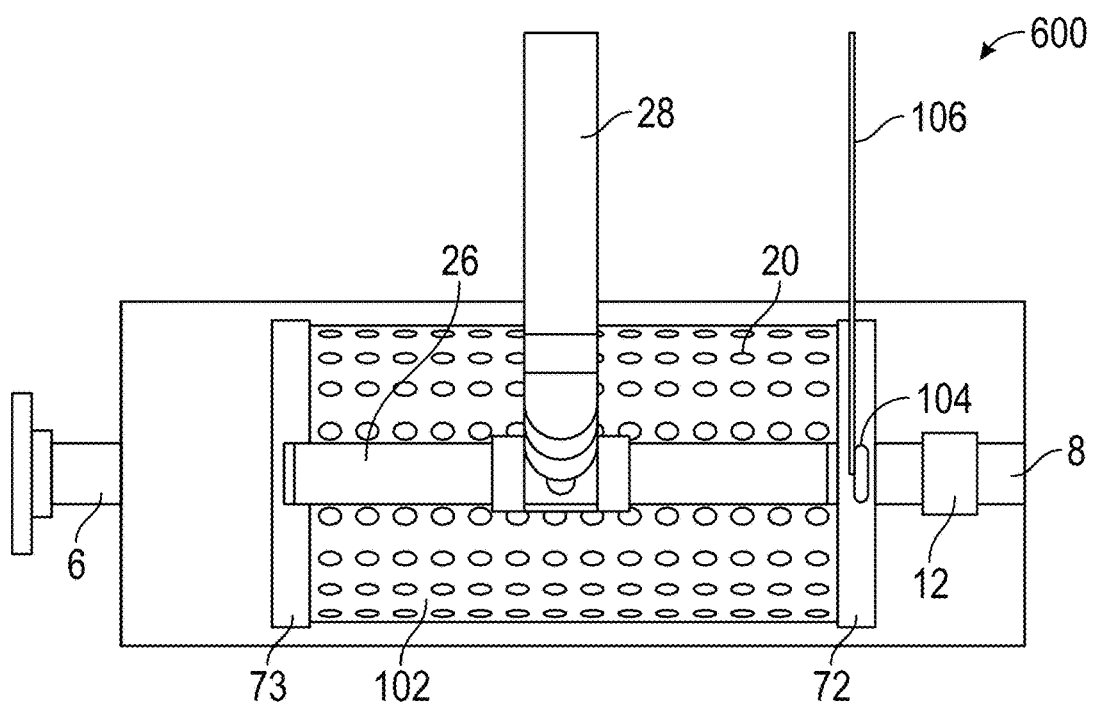
FIGS. 14-17 are schematic illustrations of another filter drum embodiment, including schematic illustration of one possible suction unit.
Figure 15:
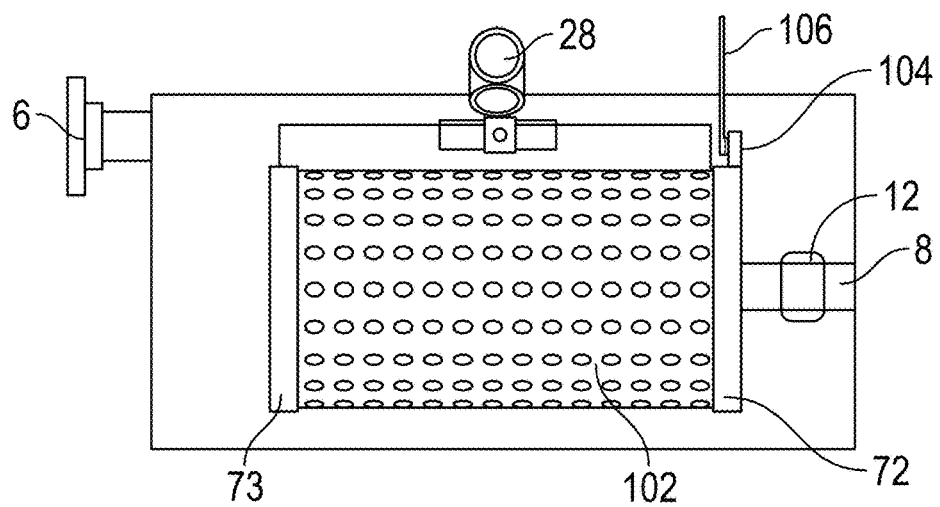
Figure 16:
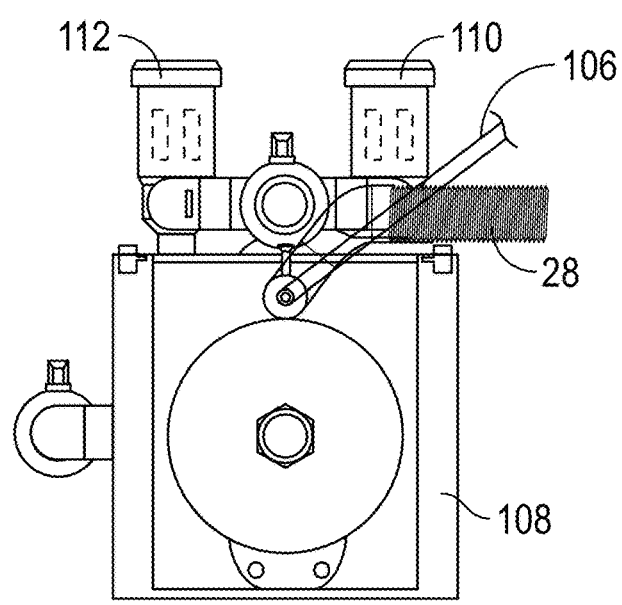
Figure 17:
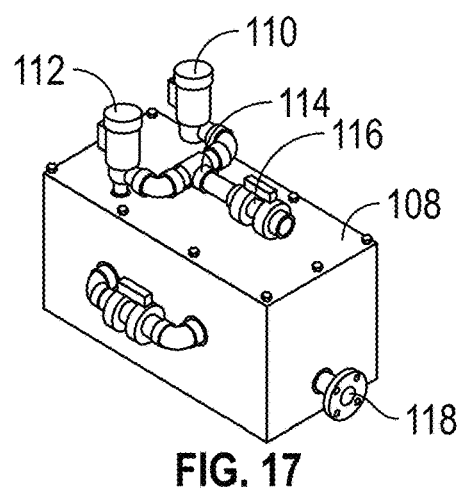

As illustrated schematically in FIGS. 14-17, certain embodiments such as embodiment 600 may include inserting one end of the drum axle into a pillow block, however, it is contemplated that certain embodiments will employ two (2) rotating pipe couplings (one on each end of the filter drum without an axle and pillow block) to convey filtrate from both ends of the filter drum as this will allow use of smaller couplings vs. enlarging the size of the pipe to handle the filtrate flow at reasonable velocities. This aides in maintaining a small foot print in certain embodiments. FIG. 14 is a schematic plan view of embodiment 600, while FIG. 15 is a schematic side view, with the side wall cut away to illustrate the filter drum 20 having a screen filter media 102, filter drum drive wheel 104, and associated driver 106, which could be a chain drive, a belt drive, or other mechanism. FIGS. 16 and 17 illustrate a suction tank enclosure or frame 108 in which a suction receiver tank (not illustrated) would be positioned. Two suction unit motors, 110, 12, are illustrated in position on a top of suction tank enclosure 108, with a T-connector/suction manifold 114 fluidly and mechanically connecting suction motors 110, 112 to cleaning conduit 28 via a quick-connect/quick-disconnect (QC/QD) connector 116. A drain valve 118 is provided for the suction receiver tank.

The filter systems and cleaning members illustrated schematically in the various figures comprise several non-limiting examples. Other configurations are possible, depending upon the specific design parameters. With regard to the cleaning member(s), the embodiment illustrated schematically in FIGS. 6-8 is just one simple arrangement and it obviously could take on additional forms including:

various shapes, widths, rows of openings from the exterior to interior;

a hooded, more triangular plenum vs. slotted pipe;

having a lag side squeegee blade to groom cleaned media;

having a lead side skid to prevent the cleaning head from diving too far into the media and 'biting';

having an installed vacuum relief valve in the cleaning head or suction manifold to prevent exceedence of a maximum vacuum;

having an integrated cleaning solution dispersing bar; and any combination of these features. As those skilled in this art will readily appreciate, there are countless variations possible and the embodiments herein are simple and effective—but not optimized.

With respect to the integrated and nonintegrated rotating pipe couplings, the inventors herein have not found suitable commercially available options that suits the purpose of conveying filtrate from the interior of the filter drum (or filter disks) while sealing clean water from dirty water while rotating submerged. There are some items available from the oil industry but they are designed for hundreds of psi pressure, are extremely costly, and are not intended for submerged use. The embodiments described herein are adequate, very simple, and extremely low cost for submerged low/no pressure application.

Process conditions and overall material balance for an example of Embodiment 600 illustrated schematically in FIGS. 14-17 are presented in Tables 2 and 3, however, these conditions and flow rates are to be considered representative only. As noted in the DDW 2014 Report, "Depending on the filter treatment process being employed, consideration must be given to solids loading from the secondary treatment process on the filter medium which can have a significant effect on loading/flux rate, TMP, filter run times, backwashing efficiency and other O&M and design elements."

Alternative system embodiments in accordance with the present disclosure may include redundancy in the form of two reduced pressure generators (30) connected in parallel, each fluidly connected to one or more cleaning heads via one or more cleaning conduits 28. These embodiments allow the filter to be used either with one reduced pressure generator or the other, or both, through use of suitable isolation valves. Alternatively, two reduced pressure sources may be configured with suitable valving so that they may be used in series or parallel flow arrangement. Alternative embodiments may be considered with three or more reduced pressure generators connected in either parallel or series configuration, or a combination of the two.

In other embodiments, one filter tank may be used with two or more filter drums (or two or more sets of filter disks) that may operate in conjunction with each other, for example, two filter drums may be arranged "side-by-side" in a single filter tank (either with or without a partition wall separating them), or two or more filter drums may be arranged in series flow relationship in the same filter tank, with one or more partition walls positioned to define two or more filtration zones. Two or more filter units may be serviced by two or more reduced pressure generators, in series and/or parallel configuration, and the reduced pressure generators may be arranged to be common to the two or more filter units or, alternatively, one or more reduced pressure generators may be dedicated to one filter unit and one or more reduce pressure generators may be dedicated to other filter units. Alternative embodiments may be contemplated where two or more filter units are serviced by two or more reduced pressure generators, in series and/or parallel configuration, and the reduced pressure generators may be arranged to be common to multiple filter units or, alternatively, one or more reduced pressure generators may be dedicated to one filter unit and one or more reduced pressure generators may be dedicated to other filter units.

TABLE 1

Example Process Conditions and System Characteristics for Three Different Filter Media

|  | Minimum | Typical[1] | Maximum |
|---|---|---|---|
| Influent Stream |  |  |  |
| Hydraulic Loading Rate (gpm/ft$^2$)[2] | 0.25 | ≤16 | 25 |
| Temperature (C.)[3] | −10 | 2 to 35 | 100 |
| Pressure (psig) | 0 | ≤2 | 5 |
| Turbidity (NTU)[4] | 0.001 | ≤10 | 1000 |
| Effluent (Filtrate) Stream |  |  |  |
| Percentage of Influent Stream Volume[5] | 80.00% | ≥99% | 99.999% |
| Temperature (C.)[2] | −10 | 2 to 35 | 100 |
| Pressure (psig) | 0 | ≤2 | 5 |
| Turbidity (NTU)[4] | 0.0005 | ≤2 | 800 |

TABLE 1-continued

Example Process Conditions and System Characteristics for Three Different Filter Media

|  | Minimum | Typical[1] | Maximum |
|---|---|---|---|
| System Characteristics |  |  |  |
| Drum/Disc Rotation Rate (rpm)[6] | 0.10 | 1.00 | 10 |
| Filter Media Type | Felt/Microscreen | Pile Cloth | Woven Belt |
| Pore Size (microns)[7] | 0.25 | 2 to 10 | 500 |
| Typical TSS Daily Loading Rate/Ft$^2$ Filter Media (lb/day/ft$^2$) | 0.01 | ≤2 | 10 |
| Wet Dry Cleaning Pressure (psig) | −5.00 | ≥−4.00 | −0.05 |
| Suction Motive Gas Displacement (SCF/ft$^2$)[8] | 5 | ≤25 | 150 |
| Cleaning Head Suction Displacement Rate (SCFM/inch of length) | 3 | ≤35 | 110 |
| Combined Liquid & Solids Volume/Ft$^2$ Filter Media (inches$^3$) | 0.35 | 27 | 144 |

[1]Typical Values are Based on 10 Micron Nominal Pile Cloth Media in Tertiary Biological Wastewater Application;
[2]Hydraulic Loading Rate varies as a function of the filter media type and permeability;
[3]Values represent temperatures typical for water filtration applications and are not mechanical limits;
[4]Values span a wide range of applications;
[5]Value is equal to {(Influent Volume − Waste Volume)/Influent Volume} averaged across 24 hours;
[6]Alternately linear drive arrangements with velocities from 0.1 to approximately 35 feet/minute are equivalent;
[7]Pores sizes may be nominal or absolute depending on filter media type.
[8]Values represent Standard Cubic Feet of Gas per Ft$^2$ of Filter Media Per Cleaning Event.

TABLE 2

Example Overall Material Balance - Embodiment 600

|  | Pounds | Kg |
|---|---|---|
| Influent Stream |  |  |
| Water | 999980 | 453583 |
| Solids | 20 | 9 |
| Effluent Stream |  |  |
| Water | 999945 | 453567 |
| Solids | 1 | 0 |
| Wet/Dry Stream |  |  |
| Water | 35 | 16 |
| Solids | 19 | 9 |

TABLE 3

Example Process Conditions, Embodiment 600

| | Broad Range | Preferred Range |
|---|---|---|
| Influent stream | | |
| Hydraulic Loading Rate (gpm/ft.$^2$) | 0.5 to 25 | 2.0 to 15 |
| Temp. (F.) | 30 to 210 | 50 to 100 |
| Pressure (psig) | 0 to 5 | 0 to 3 |
| Turbidity (NTU) | 0.01 to 1000 | 0.1 to 500 |
| Filtrate stream | | |
| Pressure (psig) | 0 to 5 | 0 to 3 |
| Turbidity (NTU) | 0.001 to 750 | 0.01 to 300 |
| Drum rotation rate (rpm) | 0.10 to 10 | 1 to 5 |
| Drum filter media | | |
| Types: pile cloth, woven clioth, non-woven cloth, felt, wire cloth, polymer belt | | |
| Pore size (millimicrons) | 0.25 to 500 | 1.0 to 200 |
| Commercial source: Various | | |
| Wet/dry Vacuum | | |
| Commercial sources: Ametek, GAST, Gardner Denver | | |
| Pressure (psig) | 0 to −5.0 | −0.5 to −5.0 |
| Flow rate | | |
| Air (ft.$^3$/ft.$^2$/day) | 1 to 30,000 | 1,000 to 20,000 |
| Air/water/solids stream | | |
| Air (scfm) | 1 to 1300 | 200 to 800 |
| Water (gal./day/ft.$^2$) | 0 to 1,000 | 3 to 300 |
| Solids (lb/ft.$^2$/day) | 0 to 10 | 0.1 to 5 |

During operation of the systems of the present disclosure, one process for treating water or wastewater may comprise:

a) flowing an influent water composition comprising water and solids into the filter tank;

b) producing an effluent stream by generating a pressure differential across the submerged portions of the one or more filtration members, causing water in the influent water composition to flow from outside to inside submerged portions of filter media of the one or more filtration members (in certain embodiments the pressure differential is produced by gravity with the differential pressure being static head of the influent on the feed side of the filter media, while other embodiments may employ one or more pumps, or both gravity and pumping action);

c) rotating the one or more filtration members so that wet, solids-laden submerged portions of the one or more filtration members become non-submerged;

wet, solids-laden filtration member portions; and d) removing wet solids from at least some of the non-submerged, wet, solids-laden filtration member portions by reducing pressure in the one or more non-submerged cleaning members. In certain embodiments, the process may include periodic rotation of the media without cleaning to essentially load the entire surface of the filter media with solids before cleaning.

Another process for treating water or wastewater using a drum filter may comprise:

a) flowing an influent water composition comprising water and solids into the filter tank;

b) producing an effluent stream by generating a pressure differential across submerged portions of a filter drum, causing water in the influent water composition to flow from outside to inside submerged portions of the filter media of the filter drum;

c) rotating the filter drum so that wet, solids-laden submerged portions of the filter media become non-submerged, wet, solids-laden filter media portions; and d) removing wet solids from the non-submerged, wet, solids-laden filter media portions by reducing pressure in the one or more non-submerged cleaning members.

Another process for treating water or wastewater using a disk filter may comprise:

a) flowing an influent water composition comprising water and solids into the filter tank;

b) producing an effluent stream by generating a pressure differential across submerged portions of one or more partially submerged filter disks, causing water in the influent water composition to flow from outside to inside submerged portions of the filter media of the one or more filter disks;

c) rotating the one or more filter disks so that wet, solids-laden filter media portions of the one or more filter disks become non-submerged, wet, solids-laden filter media portions; and d) removing wet solids from the non-submerged, wet, solids-laden filter media portions by reducing pressure in the one or more non-submerged cleaning members.

In certain embodiments, systems and processes of the present disclosure may include periodic rotation of the media without cleaning to essentially load the entire surface of the filter media with solids before cleaning.

Any known type of reduced pressure generation device (blower, Venturi eductor, wet/dry vac, or "shop vac") may be employed in practicing the systems and processes of the present disclosure, including those currently commercially available from Gast, Tuthil, Ametek, Gardner Denver, and others. Suitable filter tanks, drum filters, and disk filters would be custom fabricated. As noted herein a pump is normally not required, but if used, any known type of pump may be employed in practicing the systems and processes of the present disclosure, including positive displacement, centrifugal, horizontal, vertical pumps, and pumps operated with variable speed motors. Suitable conduits and components typically used therewith include currently commercially available stainless steel tubing, or PVC tubing available from a variety of sources, including Ryan Herco, JM Eagle, Charlotte Pipe, Cresline, and others. Any known type of mass flow meter may be employed in practicing the systems and processes of the present disclosure. Suitable mass flow meters and components typically used therewith include the coriolis flow and density meters currently commercially available from Emerson (under the trade designation ELITE Peak Performance Coriolis Flow and Density Meter) and other suppliers. Any known type of filter tank level control sensor (float, laser, or other) may be employed in practicing the systems and processes of the present disclosure.

Any known type of filter media may be employed in practicing the systems and processes of the present disclosure, including but not limited to pile fabrics, wire mesh, polymer mesh, woven and nonwoven fabrics, felts, stitch-bonded fabrics, and the like. Suitable filter media include those described in U.S. Pat. Nos. 1,833,315; 4,167,482; 4,639,315; 4,869,823; 5,560,835; 5,346,519; and 8,852,445.

As explained in the '445 patent, cloth disk filters are sized on the basis of "hydraulic loading rate", and 3 to 6 gallons/day/ft$^2$ (gpd/ft$^2$) is typical for design average flow rates of prior art cloth disk filters. Filter cloth media useful in the various embodiments of this disclosure may, in certain embodiments, be able to filter out solids having particles sizes of 10 microns or larger, or 5 microns and larger, and withstand washing or mechanical abrasion enough to remove retained materials, and may be characterized as organic polymeric filter cloth media or inorganic filter cloth media depending on the material performing the separation function. A single disk or cassette of a cloth disk filter may have a filter area ranging from 1 to about 200 ft$^2$, or from 1 to about 50 ft$^2$, or from 1 to about 20 ft$^2$, and there may be upwards of 10 filter cassettes in a single combined sludge blanket/filtration vessel. The filter area is dictated largely by the filtration task at hand, size of the vessel and influent solids loading and flow rate, and the like. It is understood that an organic filter cloth media might comprise inorganic materials, and vice versa.

Suitable cloth filter media may be woven or nonwoven, and may comprise one layer or may be multi-layered. The material selected for the filter cloth media should have numerous attributes that render the filter cloth media suitable for filtration service, such as structural integrity to withstand the pressure gradients of filtration and backflushing, and chemical resistance to attack or dissolution by the filtered species, filtrate, and chemical cleaning solutions such as chlorine, citric acid, sodium hydroxide, and other chemicals designed to minimize organic and inorganic fouling of the filter cloth media. The material should also have the ability to be fabricated readily into the preselected filter cloth media shape for a particular application. One useful cloth filter material is a nonwoven, needlefelted nylon (polyamide) fiber-based material. The same material in "pile" form is another suitable filter material. "Pile" and "needlefelting", and "needling" are terms of art in the manufacture of nonwovens, and are readily understood by those skilled in the nonwovens art. Piled materials may also be needlefelted. Additional design criteria and considerations in the fabrication and selection of cloth disk filter media are disclosed in Purchas and Sutherland, "Handbook of Filter Media", Elsevier Science Ltd. (2002), which is incorporated herein by reference, and especially Chapters 2 and 3 entitled "Woven Fabric Media" and "Nonwoven Fabric Media", respectively. Patents describing piled and/or needled nonwovens include U.S. Pat. Nos. 3,673,048 and 3,755,055, both incorporated herein by reference. In certain embodiments, the filter material may comprise membrane materials or fine screened mesh (such as stainless steel screen mesh).

During certain processes of the present disclosure, one or all of filter tank level; temperature, mass flow rate, concentrations (or percentages of set point values) of selected constituents of influent and/or effluent; and reduced pressure value of one or more cleaning members, and other parameters may be displayed locally on one or more Human Machine Interfaces (HMI), such as a laptop computer having a display screen having a graphical user interface (GUI), or handheld device, or similar, either in a dedicated control room, or remotely. In certain embodiments the HMI may record and/or transmit the data via wired or wireless communication to another HMI, such as another laptop, desktop, or hand-held computer or display. These communication links may be wired or wireless.

The filter tank, drum filter (heads, media support structure), disk filters, cleaning members, conduits, valves, and spray nozzles, may be made of metals, polymeric materials (for example, but not limited to, polypropylene, PVC, fiber-reinforced plastic (FRP)), except where felt or fabric seals, or rubber or other polymeric materials and/or seals may be employed. Suitable metals include stainless steels, for example, but not limited to, 304, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight. Threaded connections may eliminate the need for 3rd party forgings and expensive welding processes—considerably improving system delivery time and overall cost. It will be understood, however, that the use of 3rd party forgings and welding is not ruled out for system components described herein and may actually be preferable in certain situations. The skilled artisan, having knowledge of the particular application, pressures, temperatures, and available materials, will be able design the most cost effective, safe, and operable system components for each particular application without undue experimentation.

One or more control strategies may be employed, as long as the strategy includes measurement of filter tank level and (optionally) vacuum (reduced pressure); measurements to be able to determine influent and effluent properties (such as turbidity, particle counts, particle sizes, concentrations, and the like) and flow rates are preferred, and those measurements (or values derived from those measurements) may be used in controlling the systems and/or processes described herein. A pressure process control scheme may be employed, for example in conjunction with the filter tank level control devices and mass flow controllers. A master controller may be employed, but the disclosure is not so limited, as any combination of controllers may be used. Programmable logic controllers (PLCs) may be used.

Control strategies may be selected from proportional-integral (PI), proportional-integral-derivative (PID) (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The electrical connections, if used (voltage and amperage) will be appropriate for the zone rating desired of each system. In certain embodiments one or more electrical cables may be run and connected to an identified power supply at the work site to operate the HMI filter unit motor, pump and pressure reducing device. Certain embodiments may employ a dedicated power supply. The identified or dedicated power supply may be controlled by one or more logic devices so that it may be shut down. In exemplary embodiments, systems of the present disclosure may have an electrical isolation (lockout) device on a secure cabinet.

In embodiments where connection to one or more remote HMI units is desired, this may be achieved by an intrinsically safe cable and connection to allow system components to operate in the required zoned area. If no remote access is required, power to operate the HMI, motor, pump, and pressure reducing device may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) processes). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

In certain embodiments, internal algorithms in the logic device, such as a PLC, may calculate a rate of increase or decrease in water level inside the filter tank, or increase in pressure differential across filter media. These may then be displayed or audioed in a series of ways such as "percentage to cleaning" lights or sounds, and the like on one or more GUIs. In certain embodiments, an additional function within an HMI may be to audibly alarm when the calculated tank water level and/or pressure differential across the filter media rate of increase or decrease reaches a level set by the operator. In certain embodiments this alarm may be emitted locally, as well as remote from the filter system, for example in a local or remote control room.

Systems of the present disclosure, including conduits therefore, pressure reducing devices, pumps, logic devices, sensors, valves, and optional safety shutdown units should be capable of withstanding long term exposure to probable liquids and vapors, including hydrocarbons, acids, acid gases, fluids (oil-based and water-based), solvents, brine, anti-freeze compositions, hydrate inhibition chemicals, biocides, chlorine, and the like, typically encountered in water and wastewater filtering and treatment facilities.

In alternative embodiments, some or all of the system may be enclosed within a frame or cabinet, and/or truck-mounted, and/or ship-mounted. Moreover, the various components (such as the filter tank) need not have specific shapes or specific conduit routing as illustrated in the drawings, but rather could take any shape, such as a box or cube shape, elliptical, triangular, prism-shaped, hemispherical or semi-hemispherical-shaped (dome-shaped), or combination thereof and the like, as long as the system performs the desired separation. The conduit cross-sections need not be round, but may be rectangular, triangular, round, oval, and the like. It will be understood that such embodiments are part of this disclosure and deemed with in the claims. Furthermore, one or more of the various components may be ornamented with various ornamentation produced in various ways (for example stamping or engraving, or raised features such as reflectors, reflective tape), such as facility designs, operating company designs, logos, letters, words, nicknames (for example AQUAPYR, and the like). Components of the systems may include optional hand-holds, which may be machined or formed to have easy-to-grasp features for fingers, or may have rubber grips shaped and adorned with ornamental features, such as raised knobby gripper patterns.

Thus the systems and processes described herein afford ways to filter water and wastewater, and remove debris therefrom safely and economically. The following Examples may further help in understanding certain aspects of the systems and processes of this disclosure.

EXAMPLES

Backwash Efficiency

A key aspect of filtration performance is the efficiency as to which filtered liquid is used to fluidize, wash and remove retained soils from the surface of a filtration media via the reversal of filtrate flow or backwash. Both overall instantaneous flows and overall volumes per backwash event are paramount to in the design of efficient filters to reduce waste generation and the cost of pumps, piping, valves and other associated backwash components.

As the frequency of backwash events is influenced by a combination of hydraulic loading and contaminant loading, backwash volume per backwash event is a key measure of performance which can typically be compared to the thickness or depth of the filter media and the volume of liquid needed to fluidize the contaminants within the filter media and subsequently transport the contaminants from the bed with continuous rinsing for a period of time to facilitate mass transport with. The following terminology may be used:

Backwash Rate=Instantaneous backwash flow

Backwash volume=backwash rate×backwash duration

Bed Fluidization Volume=filter media depth×filter media area

Bed Volumes per Backwash Event=Backwash Volume/Bed Volume

A comparison of typical filter configurations with systems and processes of the present disclosure (known under the trade designation AQUAPYR) was made based on clean media backwash volume estimates, and this data is presented in Table 4.

TABLE 4

Comparison of Backwash Efficiency

| Filter Type | Media Thickness (inches) | Bed Fuildization Volume inch^3/Sq. Ft. Area | Liquid Backwash Rate GPM/Sq. Ft. Media | Air Cleanse Rate (CFM/sq. Ft. Media) | Backwash Duration (Seconds) | Liquid Volume (inch^3/ Backwash/ sq. ft.) | Bed Volumes Per Backwash |
|---|---|---|---|---|---|---|---|
| Multimedia (Sand) | 36 | 5184 | 15 | 0 | 1200 | 74484 | 14.37 |
| Submerged (Pile Cloth 1) | 0.375 | 54 | 1.25 | 0 | 60 | 342.75 | 6.35 |
| Submerged (Pile Cloth 2) | 0.25 | 36 | 1.25 | 0 | 60 | 324.75 | 9.02 |
| AquaPyr Process (Pile Cloth 1) | 0.375 | 54 | 0 | 2.0+ | 60 | 54 | 1.00 |
| AquaPyr Process (Pile Cloth 2) | 0.25 | 36 | 0 | 2.0+ | 60 | 36 | 1.00 |
| AquaPyr Process (Non Pile Cloth 'felt') | 0.04 | 5.76 | 0 | 2.0+ | 60 | 5.76 | 1.00 |

As may be seen from the comparative data presented in Table 4, the waste volume of systems and processes of the present disclosure will be miniscule compared to currently known filters and processes. The connected horse power is also going to be very low. The inventors herein believe systems in accordance with this disclosure could be driven off a very small power arrangement (solar or wind power, for example) as the vacuum motors are very low power draw compared to the solids handling pumps other filters use.

Figure 20:
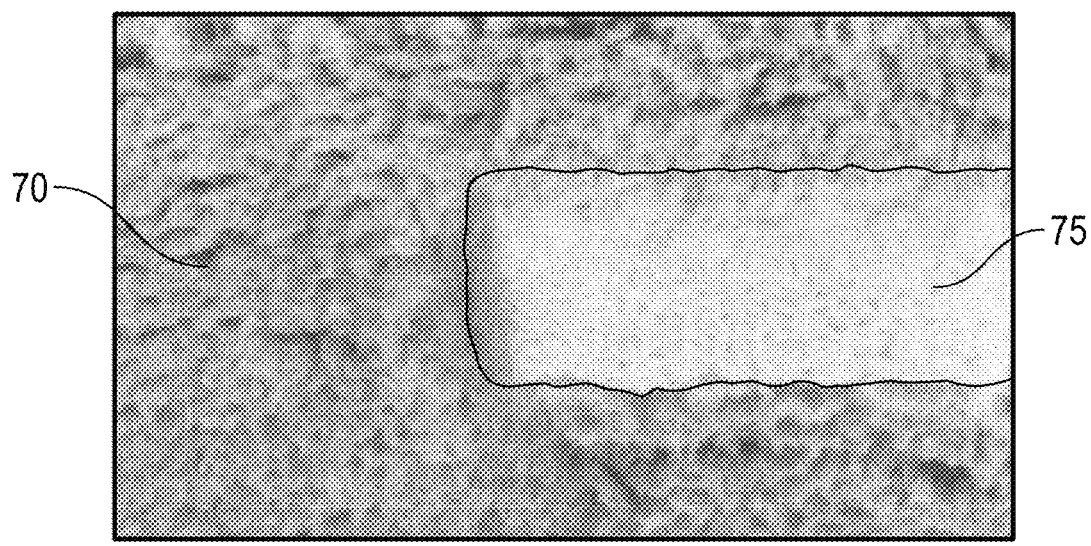
FIGS. 20-24 are photographs of illustrating visually some of the capabilities of the 'air cleansing' used in systems and processes of this disclosure.
Figure 21:
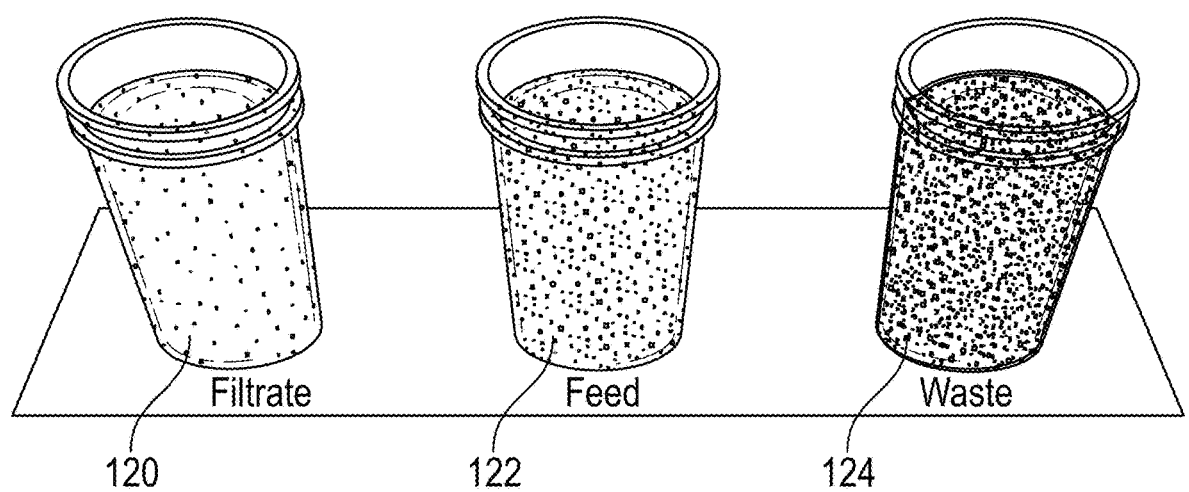
Figure 22:
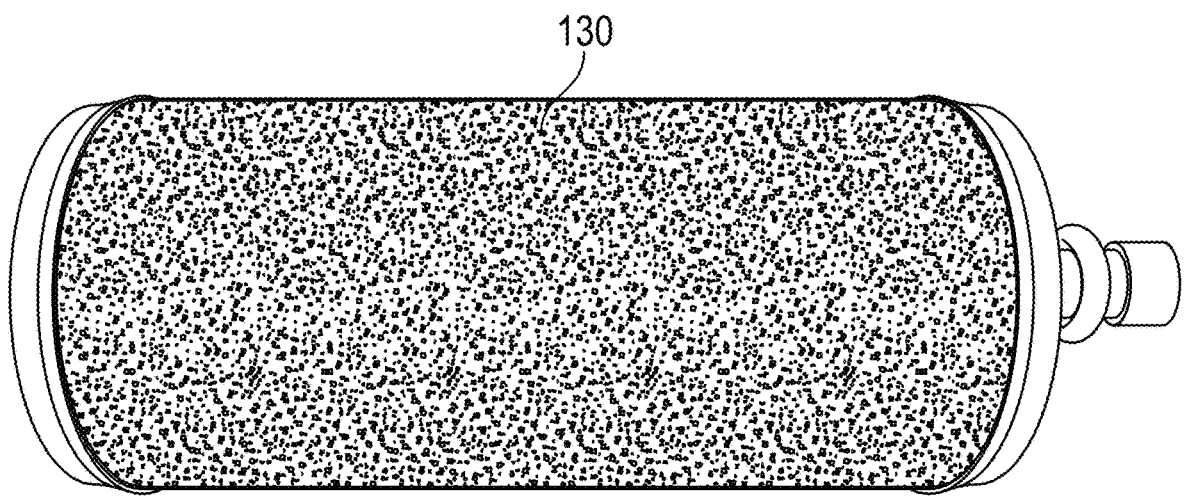
Figure 23:
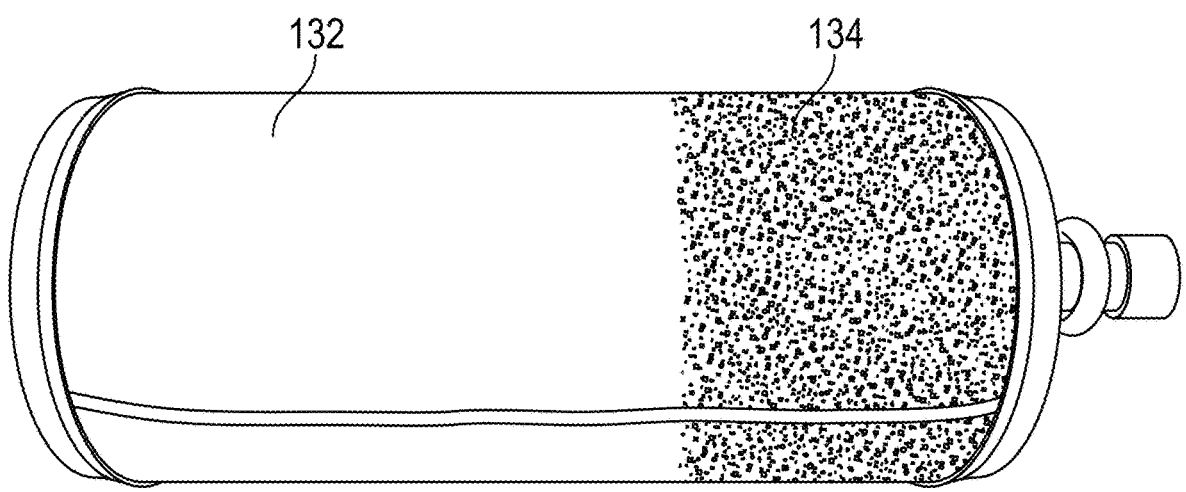
Figure 24:
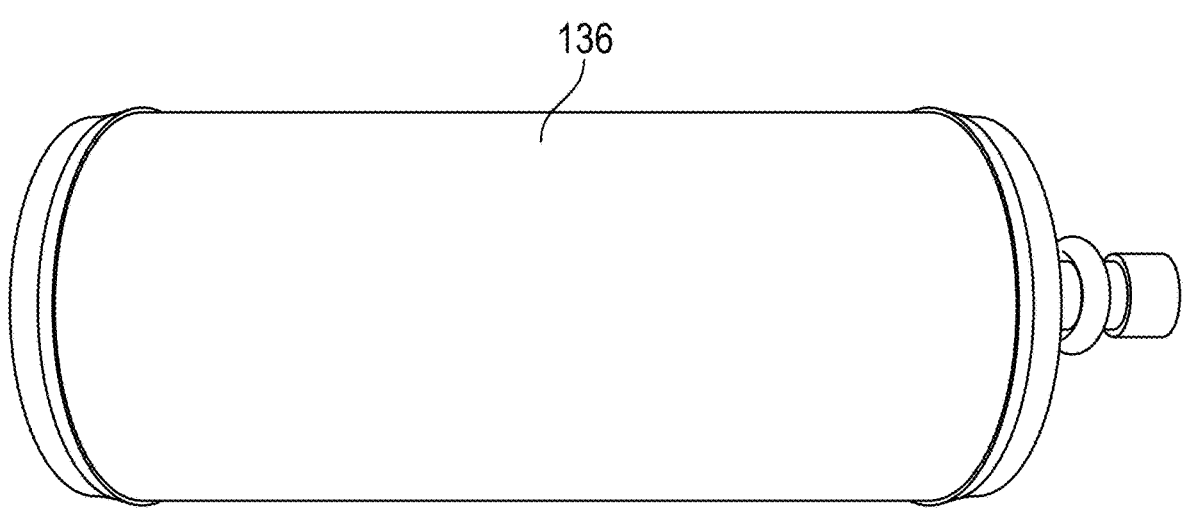

FIGS. 20-24 are photographs of illustrating visually some of the capabilities of the 'air cleansing' used in systems and processes of this disclosure. FIG. 20 is a photograph of a portion of a drum filter with pile media 75 showing an in situ cleanse test result. The pile media (70) was a fiber blend, 100% polyester, having a density of 2.25 lbs., 10 micron nominal pore size, having an acrylic back coating. The final pile height was 12/32 inch; the final length (parallel to the longitudinal axis of the drum) was 62 inches minimum; the final oz. weight/lineal yard was 36 ozs; the final oz. weight/sq. yd. was 20.2 ozs. FIG. 21 shows jar samples of filtrate (120, left), feed (122, center), and waste (124, right) from testing using the pile cloth media shown in FIG. 20, where the filtrate was %99.98 and the waste was %0.02 of the feed. FIGS. 22, 23, and 24 show the cloth pile media on a filter drum, with FIG. 22 showing the media in fouled condition at 130, FIG. 23 showing a left-hand portion 132 of the pile media after air cleaning and a right-hand portion 134 still fouled, and FIG. 24 showing the pile cloth media 136 after full air cleaning.

To get some idea of the improvement our systems and processes have in terms of waste generation, we performed a test of our 'cleanse volume' vs. what can be documented to be about 37 gallons for a small version of a cloth media disk filter known under the trade designation AQUADISK (per BW event). We recognize that would probably improve on a large version of the AQUADISK down to about 8 gallons vs. this ~⅓ gallon. However, even so this is still a large delta in our favor even using conservative best numbers for the cloth media disk filter known under the trade designation AQUADISK.

More specifically, we compared a cloth media disk filter known under the trade designation AQUADISK for a 12 sq. ft. filter—1 minute backwash with 6.7 gpm/sq. ft. volume=80 gallons. Our system comprised a 5.65 sq. ft. drum filter. At the same cleaning rate of 1 minute, we used 0.333 gallons/5.65 sq. ft=0.06 gpm/sq. ft. This comparison showed a 100× plus reduction in waste volume (however, we recognize the AquaDisk® brand disk filter figures improve on larger filters somewhat). The comparison pilot plant contained one cloth media disk filter known under the trade designation AQUADISK filter element in an 800 gallon filtration tank. The disk was 3 ft. in diameter and had an effective filtration area of approximately 12 ft². The disk was divided into two equal segments, each covered with a high-strength cloth media. For this study an acrylic pile fabric (MMK2-13) was tested. The media has a nominal pore size of 10 μm and the Title 22 approved peak hydraulic loading rate for the media is 6 gpm/ft².

Pilot testing has revealed other advantages of systems and processes of the present disclosure. For one, the cost effectiveness of the systems and processes, and ability to scale into very small modules lends itself to being able to 'stack' units in tight places with high through-put capabilities. Currently known filters typically exceed ISO shipping container dimensions. It is contemplated that certain system embodiments in accordance with the present disclosure could employ a battery of small modules (driven from a central wet dry vacuum system) that would allow for 4000+ gpm of filtration in single 40 ft. ISO shipping container. Current offerings in the mobile treatment space do not exceed 600 gpm. Another advantage we have learned is that we will be able to eliminate the influent weir that is required to operate multiple filters in parallel in current cloth media filter designs (fully submerged). This is an expensive item in current filters and it is required to balance flow distribution. In the partially submerged designs of the systems of the present disclosure the feed will self-balance as liquid levels increase and submerge more filter media—hence all filters in series will act as a single unit vs. independently.

From the foregoing detailed description of specific embodiments, it should be apparent that patentable systems, combinations, and processes have been described. Although specific embodiments of the disclosure have been described herein in some detail, this has been done solely for the purposes of describing various features and aspects of the systems and processes and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to modify or retrofit an existing water or wastewater treatment facility to include one or more systems of this disclosure, or modify a fully submerged system to a partially submerged, wet/dry system. Certain systems and processes of this disclosure may be devoid of certain steps, components and/or features: for example, systems devoid of filter disks; systems devoid of exotic metals; systems devoid of low-strength steels; systems devoid of threaded fittings; systems devoid of welded fittings; processes devoid of a separation step upstream of the filter unit; processes devoid of a pump in the effluent (filtrate) stream conduit of the filter unit.

What is claimed is:

1. A water or wastewater filtration system featuring pile cloth filter media, the system comprising:
   a) a filter tank having a floor and sidewall defining a filtration zone, an influent conduit and an effluent conduit;
   b) one or more drum filters positioned in the filter tank, the one or more drum filters and the filter tank comprising a filter unit, each of the one or more drum filters comprising a pile cloth filter media that may be the same or different from one another;
   c) one or more cleaning members positioned outside of the one or more drum filters and adjacent, or positionable adjacent, at least some portions of the pile cloth filter media;
   d) the filter unit configured to produce, by gravity-driven hydraulic head, an effluent stream by generating sufficient pressure differential across submerged portions of the pile cloth filter media to force water from an influent water or wastewater composition to flow from outside to inside the submerged portions of the pile cloth filter media and into the effluent conduit;
   e) a prime mover for continuous rotation of the one or more drum filters;
   f) a blower and chamber for creating a reduced pressure condition in each of the one or more cleaning members when the blower is energized and when adjacent non-submerged, wet solids-laden portions of the pile cloth filter media, the chamber configured to receive wet solids removed from the non-submerged, wet solids-laden portions of the pile cloth filter media by the one or more cleaning members subsequent to submerged, fouled portions of the pile cloth filter media being rotated out of the filtration zone; and
   g) a level controller configured to periodically energize the blower at a predetermined maximum water or wastewater depth in the filter tank, whereby
      1) the wet solids are removed from the non-submerged, wet solids-laden portions of the pile cloth filter media by the blower, and
      2) the non-submerged pile cloth filter media from which wet solids have been removed is further cleansed of collected solids and entrapped water employing air drawn from inside of the one or more drum filters by the blower.

2. The system of claim 1 wherein the one or more drum filters is a single drum filter.

3. The system of claim 2 wherein the one or more cleaning members is a single cleaning member comprising a body having a length (L) and a width (W), the length (L) of the cleaning member corresponding substantially with a length of the drum filter (DFL).

4. The system of claim 2 wherein the one or more cleaning members comprises a set of cleaning members, each comprising a body having a length ($L_1$) and a width (W), a first sub-set of the set of cleaning members positioned so that their combined length corresponds substantially with a length of the drum filter (DFL), and a second sub-set of the plurality of cleaning members positioned behind the first sub-set such that a length ($L_2$) of each of the second sub-set overlaps a position where two of the first sub-set of cleaning members have abutting ends.

5. The system of claim 2 wherein the one or cleaning members comprises first and second cleaning members, each cleaning member comprising a body having substantially same length (L) and a width (W), the length (L) of the first and second cleaning members corresponding substantially with a length of the drum filter (DFL).

6. The system of claim 1 further comprising a cleaning conduit fluidly connecting each of the one or more cleaning members with the blower and chamber for creating the reduced pressure condition in each of the one or more non-submerged cleaning members.

7. The system of claim 1 further comprising a cleaning composition supply vessel, a cleaning composition supply conduit fluidly connecting the cleaning composition supply vessel with a set of spray nozzles positioned to spray a cleaning composition onto at least some of the non-submerged portions of the one or more drum filters, and a cleaning composition supply valve in the cleaning composition supply conduit.

8. A water or wastewater filtration system featuring pile cloth filter media, the system comprising:
   a) a filter tank having a floor and sidewall defining a filtration zone, an influent conduit and an effluent conduit;
   b) a drum filter having a drum filter length and radius, the drum filter positioned in the filter tank, the drum filter and the filter tank comprising a filter unit, the drum filter comprising a pile cloth filter media;
   c) one or more cleaning members positioned outside of the drum filter and adjacent, or positionable adjacent, at least some portions of the pile cloth filter media;
   d) the filter unit configured to produce, by gravity-driven hydraulic head, an effluent stream by generating sufficient pressure differential across submerged portions of the pile cloth filter media to force water from an influent water or wastewater composition to flow from outside to inside the submerged portions of the pile cloth filter media and into the effluent conduit;
   e) a prime mover for periodic rotation of the drum filter;
   f) a blower and chamber for creating a reduced pressure condition in each of the one or more cleaning members when the blower is energized and when adjacent non-submerged, wet solids-laden portions of the pile cloth filter media, the chamber configured to receive wet solids removed from the non-submerged, wet solids-laden portions of the pile cloth filter media by the one or more cleaning members subsequent to submerged, fouled portions of the pile cloth filter media being rotated out of the filtration zone; and
   g) a level controller configured to periodically energize the prime mover and the blower at a predetermined maximum water or wastewater depth in the filter tank, whereby 1) the submerged wet solids-laden portion of the pile cloth filter media is rotated so as to be non-submerged;
2) the wet solids are removed from the non-submerged, wet solids-laden portions of the pile cloth filter media, and
3) the non-submerged pile cloth filter media from which wet solids have been removed is further cleansed of collected solids and entrapped water employing air drawn from inside of the drum filter.

9. The system of claim 8 wherein the length of the drum filter and the length of the filter tank are related by a ratio ranging from about 1:2 to about 9:10.

10. The system of claim 8 wherein the one or more cleaning members is a single cleaning member comprising a body having a length and a width, the length of the cleaning member corresponding substantially with the length of the drum filter.

11. A process for treating water or wastewater using the system of claim 1, comprising:
a) flowing an influent water composition comprising water and solids into the filter tank;
b) producing an effluent stream by generating a pressure differential across submerged portions of the one or more drum filters, causing water in the influent water composition to flow from outside to inside the submerged portions of the pile cloth filter media of the one or more drum filters;
c) rotating the one or more drum filters so that wet, solids-laden submerged pile cloth filter media portions of the one or more drum filters become non-submerged, wet, solids-laden pile cloth filter media portions;
d) allowing the level to reach the predetermined maximum water or wastewater depth in the filter tank; and
e) energizing the blower to remove the wet solids from at least some of the non-submerged, wet, solids-laden pile cloth filter media portions by reducing pressure in the one or more cleaning members, whereby
1) the wet solids are removed from the non-submerged, wet solids-laden portions of the pile cloth filter media by the blower, and
2) the pile cloth filter media is cleansed of collected solids and entrapped water employing air drawn from inside of the one or more drum filters by the blower.

12. A process for treating water or wastewater using the system of claim 8, comprising:
a) flowing an influent water composition comprising water and solids into the filter tank;
b) producing an effluent stream by generating a pressure differential across submerged portions of the pile cloth filter media of the drum filter, causing water in the influent water composition to flow from outside to inside the submerged portions of the pile cloth filter media;
c) rotating the drum filter so that wet, solids-laden submerged portions of the pile cloth filter media become non-submerged, wet, solids-laden pile cloth filter media portions; and
d) allowing the level to reach the predetermined maximum water or wastewater depth in the filter tank; and
e) energizing the blower to remove the wet solids from at least some of the non-submerged, wet, solids-laden pile cloth filter media portions by reducing pressure in the one or more cleaning members, whereby
1) the wet solids are removed from the non-submerged, wet solids-laden portions of the pile cloth filter media by the blower, and
2) the pile cloth filter media is cleansed of collected solids and entrapped water employing air drawn from inside of the drum filter by the blower.

13. A water or wastewater filtration system comprising:
a) a filter tank having a floor and sidewall defining a filtration zone, an influent conduit and an effluent conduit;
b) one or more drum filters positioned in the filter tank, the one or more drum filters and the filter tank comprising a filter unit, each of the one or more drum filters comprising a filter media that may be the same or different from one another;
c) one or more cleaning members positioned adjacent, or positionable adjacent, at least some portions of the filter media, the one or more cleaning members comprising a set of cleaning members, each cleaning member comprising a body having a length ($L_1$) and a width (W), a first sub-set of the set of cleaning members positioned so that their combined length corresponds substantially with a length of the one or more drum filters (DFL), and a second sub-set of the plurality of cleaning members positioned behind the first sub-set such that a length ($L_2$) of each of the second sub-set overlaps a position where two of the first sub-set of cleaning members have abutting ends;
d) the filter unit configured to produce, by gravity-driven hydraulic head, one or more pumps, or both, an effluent stream by generating sufficient pressure differential across submerged portions of the filter media to force water from an influent water or wastewater composition to flow from outside to inside the submerged portions of the filter media and into the effluent conduit;
e) a prime mover for rotating the one or more filtration members; and
f) a blower and chamber for creating a reduced pressure condition in each of the one or more cleaning members when the blower is energized and when adjacent non-submerged, wet solids-laden portions of the filter media, the chamber configured to receive wet solids removed from the non-submerged, wet solids-laden portions of the filter media by the one or more cleaning members subsequent to submerged, fouled portions of the filter media being rotated out of the filtration zone.

14. The system of claim 13 further comprising a cleaning conduit fluidly connecting each of the one or more cleaning members with the blower and chamber for creating the reduced pressure condition in each of the one or more non-submerged cleaning members.

15. The system of claim 13 further comprising a cleaning composition supply vessel, a cleaning composition supply conduit fluidly connecting the cleaning composition supply vessel with a set of spray nozzles positioned to spray a cleaning composition onto at least some of the non-submerged portions of the one or more drum filters, and a cleaning composition supply valve in the cleaning composition supply conduit.

* * * * *